United States Patent
Urakawa et al.

(10) Patent No.: US 8,125,864 B2
(45) Date of Patent: Feb. 28, 2012

(54) INFORMATION PROCESSING DEVICE AND METHOD, PROGRAM, AND RECORDING/REPRODUCING DEVICE

(75) Inventors: Yoshiyuki Urakawa, Kanagawa (JP); Tomoharu Mukasa, Saitama (JP)

(73) Assignee: Sony Corporation (JP)

( * ) Notice: Subject to any disclaimer, the term of this patent is extended or adjusted under 35 U.S.C. 154(b) by 305 days.

(21) Appl. No.: 12/383,869

(22) Filed: Mar. 30, 2009

(65) Prior Publication Data

US 2009/0249378 A1 Oct. 1, 2009

(30) Foreign Application Priority Data

Mar. 31, 2008 (JP) ................ P2008-092186

(51) Int. Cl.
*G11B 7/00* (2006.01)
(52) U.S. Cl. .............. 369/47.45; 369/47.46; 369/47.55; 369/53.28; 369/53.35; 369/53.37; 700/302
(58) Field of Classification Search .................. 720/659; 700/302; 369/47.45, 47.46, 47.55, 53.28, 369/53.35, 53.37
See application file for complete search history.

(56) References Cited

U.S. PATENT DOCUMENTS

| | | | |
|---|---|---|---|
| 5,164,931 A | 11/1992 | Yamaguchi et al. | |
| 5,805,548 A * | 9/1998 | Ishihara et al. | 369/47.43 |
| 6,341,107 B1 * | 1/2002 | Watanabe | 369/44.29 |
| 7,319,646 B2 * | 1/2008 | Nishiguchi | 369/47.39 |
| 7,570,550 B2 * | 8/2009 | Harai et al. | 369/44.27 |
| 7,619,952 B2 * | 11/2009 | Wang | 369/44.28 |
| 2007/0263503 A1 * | 11/2007 | Kawabe | 369/44.34 |

FOREIGN PATENT DOCUMENTS

| | | |
|---|---|---|
| JP | 61120214 A | 6/1986 |
| JP | 01-138666 A | 5/1989 |
| JP | 03-288913 A | 12/1991 |
| JP | 2685622 A | 12/1991 |
| JP | 06139589 A | 5/1994 |
| JP | 08234803 A | 9/1996 |

(Continued)

OTHER PUBLICATIONS

Machine Translation of Japanese 2008010034 on Jun. 27, 2006 by Suzuki Yuichi.*
Machine Translation of Japanese 08234803 on Sep. 13 1996 by Kan Toshiya.*

(Continued)

*Primary Examiner* — Wayne Young
*Assistant Examiner* — Linh Nguyen
(74) *Attorney, Agent, or Firm* — Lerner, David, Littenberg, Krumbolz & Mentlik, LLP

(57) ABSTRACT

An information processing device includes: a correction coefficient holding unit configured to hold a correction coefficient which is a ratio between the position of a control target at a start time of control operation, and a detection signal indicating the control result of the control target; an initial-value-compensation matrix holding unit configured to hold an initial-value-compensation matrix for performing compensation of the initial value of a control computing unit for computing control output for controlling the control target from the detection signal based on the position and speed of the control target; and an initial-value generating unit configured to correct the position and speed of the control target at a start time of control operation with the correction coefficient, and employ the position and speed of the control target after correction, and the initial-value-compensation matrix to generate an initial-value-compensation value for compensating the initial value of the control computing unit.

22 Claims, 14 Drawing Sheets

FOREIGN PATENT DOCUMENTS

| | | | |
|---|---|---|---|
| JP | 11265513 | A | 9/1999 |
| JP | 2003157633 | A | 5/2003 |
| JP | 2007334959 | A | 12/2007 |
| JP | 2008010034 | A | 1/2008 |

OTHER PUBLICATIONS

Office Action from Japanese Application No. 2008-092186, dated Jun. 15, 2010.

* cited by examiner

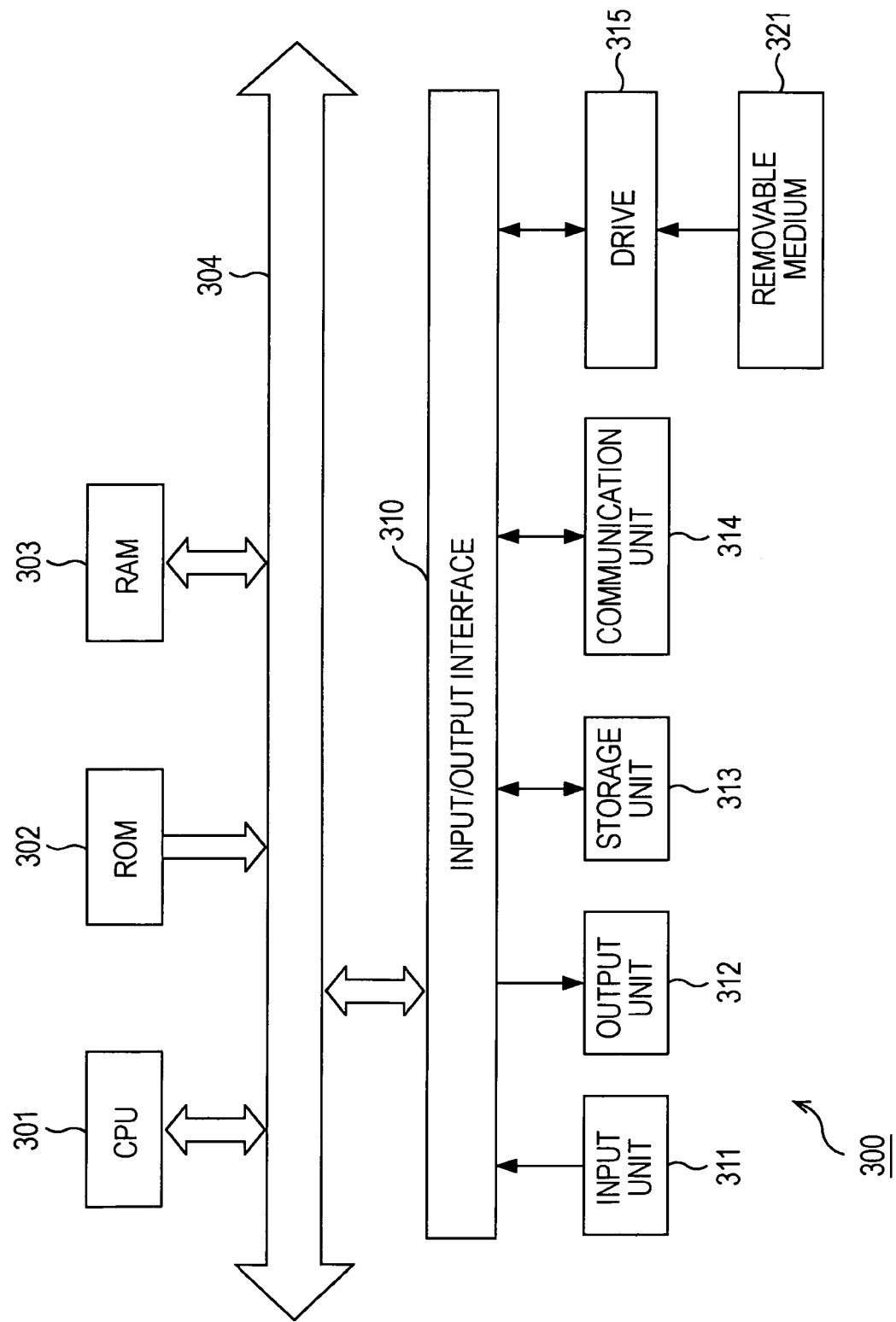

INFORMATION PROCESSING DEVICE AND METHOD, PROGRAM, AND RECORDING/REPRODUCING DEVICE

CROSS REFERENCES TO RELATED APPLICATIONS

The present application claims priority from Japanese Patent Application No. JP 2008-092186, filed in the Japanese Patent Office on Mar. 31, 2008, the entire content of which is incorporated herein by reference.

BACKGROUND OF THE INVENTION

1. Field of the Invention

The present invention relates to an information processing device and method, program, and recording/reproducing device, and specifically, relates to an information processing device and method, program, and recording/reproducing device which enable an initial value to be compensated in a more suitable manner with a control system for controlling the operation of an object of control to direct the angle or position thereof toward a target value.

2. Description of the Related Art

Heretofore, with an optical disc recording/reproducing device, servo control has been performed to condense a laser beam to a fixed position. Specifically, focus servo control for correcting condensed position shift in a disc-vertical direction, and tracking servo control for correcting condensed position shift in a disc-radial direction are performed. A servo controller is realized generally by the following filter for emphasizing low-frequency components, and performing phase shift compensation at a high frequency. Specifically, a filter is employed, which emphasizes the low-frequency components of an error signal to suppress low-frequency position shift, performs compensation of phase shift at a high frequency, thereby operating a control system in a stable manner.

This error signal is generated under reflected light from an optical disc, but a detection region whereby a normal error signal can be detected is limited. Therefore, for example, with the focus servo control, a lens mounted on an actuator is driven to a detection region, and confirmation is made whether or not the lens is in the detection region, following which a servo control operation is started. Also, with the tracking servo control, the detection region is relatively swung as to the lens in a stationary state due to disc eccentricity, and accordingly, a servo control operation is started while considering a point in time wherein relative speed is slow.

As described above, at a point in time where a servo control operation is started, the relative position and relative speed of the actuator as to a target position are frequently not zero. At this time, the relative position or relative speed is sufficiently small, and the actuator position converges at the target position through transient response. However, if the relative position or relative speed is great (not sufficiently small), the actuator position protrudes from the detection region due to saturation of actuator thrust during transient response, or the like, and consequently, the actuator position does not converge at the target position in some cases.

In order to suppress occurrence of such a situation, techniques have been generally employed, such as a servo control operation being started at a position where the relative position is as small as possible, speed servo control being performed before a servo control operation is started to reduce the relative speed, or the like.

Also, a technique has been proposed wherein a transient response correction value is charged in a capacitor within an integrator of a servo controller before start of the servo control, and with this as an initial value of the integrator, the servo control is started, thereby reducing transient response (e.g., see Japanese Unexamined Patent Application Publication No. 1-138666). Further, a technique has also been proposed wherein compensation quantity corresponding to the properties of an object of control is obtained, or the initial settings of a servo controller are performed by obtaining a coefficient to compute an initial value, thereby performing a positioning operation in a stable manner (e.g., see U.S. Pat. No. 2,685,622). In this way, techniques have been proposed wherein stable transient response is obtained by setting the initial value of the servo controller to a suitable value to perform initial value compensation.

SUMMARY OF THE INVENTION

However, though the relative position and relative speed are set based on an error signal, in a case of an optical disc, according to the properties of optical elements, an error signal is not necessarily proportional to the relative position with the entire detection region. Specifically, an error signal is frequently detected to be small as to the relative position around the limit of a detection range. Therefore, in the case of employing an initial value compensation method which employs the value of an error signal as the relative position without being subjected to any correction, compensation of the initial value is performed based on the error signal detected to be smaller than the actual relative position, there has been a possibility that the assumed advantage might not be obtained. In order to suppress occurrence of such a situation, an arrangement can be conceived wherein the detected error signal is corrected to perform compensation of the initial value, but it takes time to calculate correction thereof, and consequently, there is a possibility that compensation of the initial value might not be in time. Also, a new circuit for correction has to be provided, which increases the circuit scale, and accordingly, there is a possibility that development costs, manufacturing costs, operational costs, and so forth might increase.

There has been recognized demand to enable compensation of the initial value of a control system for controlling the angle or position of an object of control to direct toward a target value in a more readily suitable manner.

According to an embodiment of the present invention, an information processing device includes: a correction coefficient holding unit configured to hold a correction coefficient which is a ratio between the position of an object of control at a start time of control operation, and a detection signal indicating the control result of the object of control, with a control system for controlling the operation of the object of control so as to direct the angle or position thereof toward a target value; an initial value compensation matrix holding unit configured to hold an initial value compensation matrix for performing compensation of the initial value of a control computing unit for computing control output for controlling the object of control from the detection signal based on the position and speed of the object of control; and an initial value generating unit configured to correct the position and speed of the object of control at a start time of control operation with the correction coefficient, and employ the position and speed of the object of control after correction, and the initial value compensation matrix to generate an initial value compensation value for compensating the initial value of the control computing unit.

The information processing device may further include a speed generating unit configured to generate from the position of the object of control at a start time of control operation the speed of the object of control at the start time of control operation, with the initial value generating unit employing the speed generated by the speed generating unit to generate the initial value compensation value.

The speed generating unit may generate the speed based on the position of the object of control at a start time of control operation, and the position of the object of control one sample ahead from the start time of control operation.

The speed generating unit may generate the speed based on the position of the object of control at a start time of control operation, and the position of the object of control a plurality of samples ahead from the start time of control operation.

The correction coefficient holding unit may hold a correction coefficient for position for correcting the position of the object of control, and a correction coefficient for speed for correcting the speed of the object of control.

According to an embodiment of the present invention, an information processing method includes the steps of: holding a correction coefficient which is a ratio between the position of an object of control at a start time of control operation, and a detection signal indicating the control result of the object of control, with a control system for controlling the operation of the object of control so as to direct the angle or position thereof toward a target value; holding an initial value compensation matrix for performing compensation of the initial value of a control computing unit for computing control output for controlling the object of control from the detection signal based on the position and speed of the object of control; and correcting the position and speed of the object of control at a start time of control operation with the correction coefficient, and employing the position and speed of the object of control after correction, and the initial value compensation matrix to generate an initial value compensation value for compensating the initial value of the control computing unit.

According to an embodiment of the present invention, a program, which, in order to process information, causes a computer to function as: a correction coefficient holding unit configured to hold a correction coefficient which is a ratio between the position of an object of control at a start time of control operation, and a detection signal indicating the control result of the object of control, with a control system for controlling the operation of the object of control so as to direct the angle or position thereof toward a target value; an initial value compensation matrix holding unit configured to hold an initial value compensation matrix for performing compensation of the initial value of a control computing unit for computing control output for controlling the object of control from the detection signal based on the position and speed of the object of control; and an initial value generating unit configured to correct the position and speed of the object of control at a start time of control operation with the correction coefficient, and employ the position and speed of the object of control after correction, and the initial value compensation matrix to generate an initial value compensation value for compensating the initial value of the control computing unit.

According to an embodiment of the present invention, a recording/reproducing device includes: a recording/reproducing element configured to perform writing or reading of data as to a disc-shaped recording medium; a driving unit configured to drive the recording/reproducing element in the horizontal direction or vertical direction as to a recording face of the disc-shaped recording medium; an error signal detecting unit configured to detect an error signal which is proportional to the difference between a position to be recorded/reproduced by the recording/reproducing element and the actual position; a control computing unit configured to employ a control parameter to perform control calculation as to the detection signal detected by the error signal detecting unit, and calculate control output for reducing the absolute value of the error signal; and an initial value compensation value generating unit configured to generate an initial value compensation value for compensating the initial value of the control computing unit at a start time of control operation with a servo control system including the driving unit, the error signal detecting unit, and the control computing unit, with the initial value compensation value generating unit including a correction coefficient holding unit configured to hold a correction coefficient which is a ratio between the position of the recording/reproducing element at a start time of control operation, and the error signal, an initial value compensation matrix holding unit configured to hold an initial value compensation matrix for performing compensation of the initial value of the control computing unit based on the position and speed of the recording/reproducing element at a start time of control operation, and an initial value generating unit configured to correct the position and speed of the object of control at a start time of control operation with the correction coefficient, employ the position and speed of the object of control after correction, and the initial value compensation matrix to generate the initial value compensation value.

With the above embodiment of the present invention, with a control system for controlling the operation of the object of control so as to direct the angle or position thereof toward a target value, a correction coefficient is held, which is a ratio between the position of an object of control at a start time of control operation, and a detection signal indicating the control result of the object of control, an initial value compensation matrix is held, which performs compensation of the initial value of a control computing unit for computing control output for controlling the object of control from the detection signal based on the position and speed of the object of control at a start time of control operation, the position and speed of the object of control at a start time of control operation is corrected with the correction coefficient, and the position and speed of the object of control after correction, and the initial value compensation matrix are employed to generate an initial value compensation value for compensating the initial value of the control computing unit.

With the above embodiment of the present invention, there are provided a recording/reproducing element configured to perform writing or reading of data as to a disc-shaped recording medium, a driving unit configured to drive the recording/reproducing element in the horizontal direction or vertical direction as to a recording face of the disc-shaped recording medium, an error signal detecting unit configured to detect an error signal which is proportional to the difference between a position to be recorded/reproduced by the recording/reproducing element and the actual position, a control computing unit configured to employ a control parameter to perform control calculation as to the detection signal detected by the error signal detecting unit, and calculate control output for reducing the absolute value of the error signal, and an initial value compensation value generating unit configured to generate an initial value compensation value for compensating the initial value of the control computing unit at a start time of control operation with a servo control system including the driving unit, the error signal detecting unit, and the control computing unit, wherein a correction coefficient is held, which is a ratio between the position of the recording/reproducing element at a start time of control operation, and the error signal, an initial value compensation matrix is held, which performs compensation of the initial value of the control computing unit based on the position and speed of the recording/reproducing element at a start time of control operation, the position and speed of the object of control at a start time of control operation is corrected with the correction coefficient, and the position and speed of the object of control after correction, and the initial value compensation matrix are employed to generate an initial value compensation value.

According to an embodiment of the present invention, an information processing device includes: a corrected initial value compensation matrix holding unit configured to hold a correction coefficient which is a ratio between the position of an object of control at a start time of control operation, and a detection signal indicating the control result of the object of control, and a corrected initial value compensation matrix which is a multiplication result of an initial value compensation matrix for performing compensation of the initial value of a control computing unit for computing control output for controlling the object of control from the detection signal based on the position and speed of the object of control at a start time of control operation, with a control system for controlling the operation of the object of control so as to direct the angle or position thereof toward a target value; and an initial value generating unit configured to employ the position and speed of the object of control at a start time of control operation, and the corrected initial value compensation matrix to generate an initial value compensation value for compensating the initial value of the control computing unit.

The information processing device may further include a speed generating unit configured to generate from the position of the object of control at a start time of control operation the speed of the object of control at the start time of control operation, with the initial value generating unit employing the speed generated by the speed generating unit to generate the initial value compensation value.

The speed generating unit may generate the speed based on the position of the object of control at a start time of control operation, and the position of the object of control one sample ahead from the start time of control operation.

The speed generating unit may generate the speed based on the position of the object of control at a start time of control operation, and the position of the object of control a plurality of samples ahead from the start time of control operation.

The corrected initial value compensation matrix holding unit may hold a multiplication result obtained by multiplying the initial value compensation matrix by a correction coefficient for position for correcting the position of the object of control, and a correction coefficient for speed for correcting the speed of the object of control, as the corrected initial value compensation matrix.

According to an embodiment of the present invention, an information processing method includes the steps of: holding a correction coefficient which is a ratio between the position of an object of control at a start time of control operation, and a detection signal indicating the control result of the object of control, and a corrected initial value compensation matrix which is a multiplication result of an initial value compensation matrix for performing compensation of the initial value of a control computing unit for computing control output for controlling the object of control from the detection signal based on the position and speed of the object of control at a start time of control operation, with a control system for controlling the operation of the object of control so as to direct the angle or position thereof toward a target value; and employing the position and speed of the object of control at a start time of control operation, and the corrected initial value compensation matrix to generate an initial value compensation value for compensating the initial value of the control computing unit.

According to an embodiment of the present invention, a program, which, in order to process information, causes a computer to function as: a corrected initial value compensation matrix holding unit configured to hold a correction coefficient which is a ratio between the position of an object of control at a start time of control operation, and a detection signal indicating the control result of the object of control, and a corrected initial value compensation matrix which is a multiplication result of an initial value compensation matrix for performing compensation of the initial value of a control computing unit for computing control output for controlling the object of control from the detection signal based on the position and speed of the object of control at a start time of control operation, with a control system for controlling the operation of the object of control so as to direct the angle or position thereof toward a target value; and an initial value generating unit configured to employ the position and speed of the object of control at a start time of control operation, and the corrected initial value compensation matrix to generate an initial value compensation value for compensating the initial value of the control computing unit.

According to an embodiment of the present invention, a recording/reproducing device includes: a recording/reproducing element configured to perform writing or reading of data as to a disc-shaped recording medium; a driving unit configured to drive the recording/reproducing element in the horizontal direction or vertical direction as to a recording face of the disc-shaped recording medium; an error signal detecting unit configured to detect an error signal which is proportional to the difference between a position to be recorded/reproduced by the recording/reproducing element and the actual position; a control computing unit configured to employ a control parameter to perform control calculation as to the detection signal detected by the error signal detecting unit, and calculate control output for reducing the absolute value of the error signal; and an initial value compensation value generating unit configured to generate an initial value compensation value for compensating the initial value of the control computing unit at a start time of control operation with a servo control system including the driving unit, the error signal detecting unit, and the control computing unit, with the initial value compensation value generating unit including a corrected initial value compensation matrix holding unit configured to hold a correction coefficient which is a ratio between the position of the recording/reproducing element at a start time of control operation, and the error signal, and a corrected initial value compensation matrix which is a multiplication result of an initial value compensation matrix for performing compensation of the initial value of the control computing unit based on the position and speed of the recording/reproducing element at a start time of control operation, and an initial value generating unit configured to employ the position and speed of the object of control at a start time of control operation, and the corrected initial value compensation matrix to generate the initial value compensation value.

With the above embodiment of the present invention, with a control system for controlling the operation of the object of control so as to direct the angle or position thereof toward a target value, a correction coefficient which is a ratio between the position of an object of control at a start time of control operation, and a detection signal indicating the control result of the object of control, and a corrected initial value compensation matrix which is a multiplication result of an initial value compensation matrix for performing compensation of the initial value of a control computing unit for computing control output for controlling the object of control from the detection signal based on the position and speed of the object of control at a start time of control operation are held, the position and speed of the object of control at a start time of control operation, and the position and speed of the object of control after correction, and the corrected initial value compensation matrix are employed to generate an initial value compensation value for compensating the initial value of the control computing unit.

With the above embodiment of the present invention, there are provided a recording/reproducing element configured to perform writing or reading of data as to a disc-shaped recording medium, a driving unit configured to drive the recording/reproducing element in the horizontal direction or vertical direction as to a recording face of the disc-shaped recording medium, an error signal detecting unit configured to detect an error signal which is proportional to the difference between a position to be recorded/reproduced by the recording/reproducing element and the actual position, a control computing unit configured to employ a control parameter to perform control calculation as to the detection signal detected by the error signal detecting unit, and calculate control output for reducing the absolute value of the error signal, and an initial value compensation value generating unit configured to generate an initial value compensation value for compensating the initial value of the control computing unit at a start time of control operation with a servo control system including the driving unit, the error signal detecting unit, and the control computing unit, wherein a correction coefficient which is a ratio between the position of the recording/reproducing element at a start time of control operation, and the error signal, a corrected initial value compensation matrix which is a multiplication result of an initial value compensation matrix for performing compensation of the initial value of the control computing unit based on the position and speed of the recording/reproducing element at a start time of control operation are held, the position and speed of the object of control at a start time of control operation, and the corrected initial value compensation matrix are employed to generate an initial value compensation value.

According to embodiments of the present invention, the control system can be operated in a stable manner. Specifically, compensation of the initial value of the control system for controlling the angle or position of the object of control to direct toward a target value can be performed in a readily suitable manner.

BRIEF DESCRIPTION OF THE DRAWINGS

FIG. 15 is a block diagram illustrating a configuration example of a personal computer to which an embodiment of the present invention has been applied.

DESCRIPTION OF THE PREFERRED EMBODIMENTS

The details of the present embodiment will be described below with the tracking servo control with an optical disc recording/reproducing device as an example. First, the tracking servo control thereof will be described.

Figure 1:
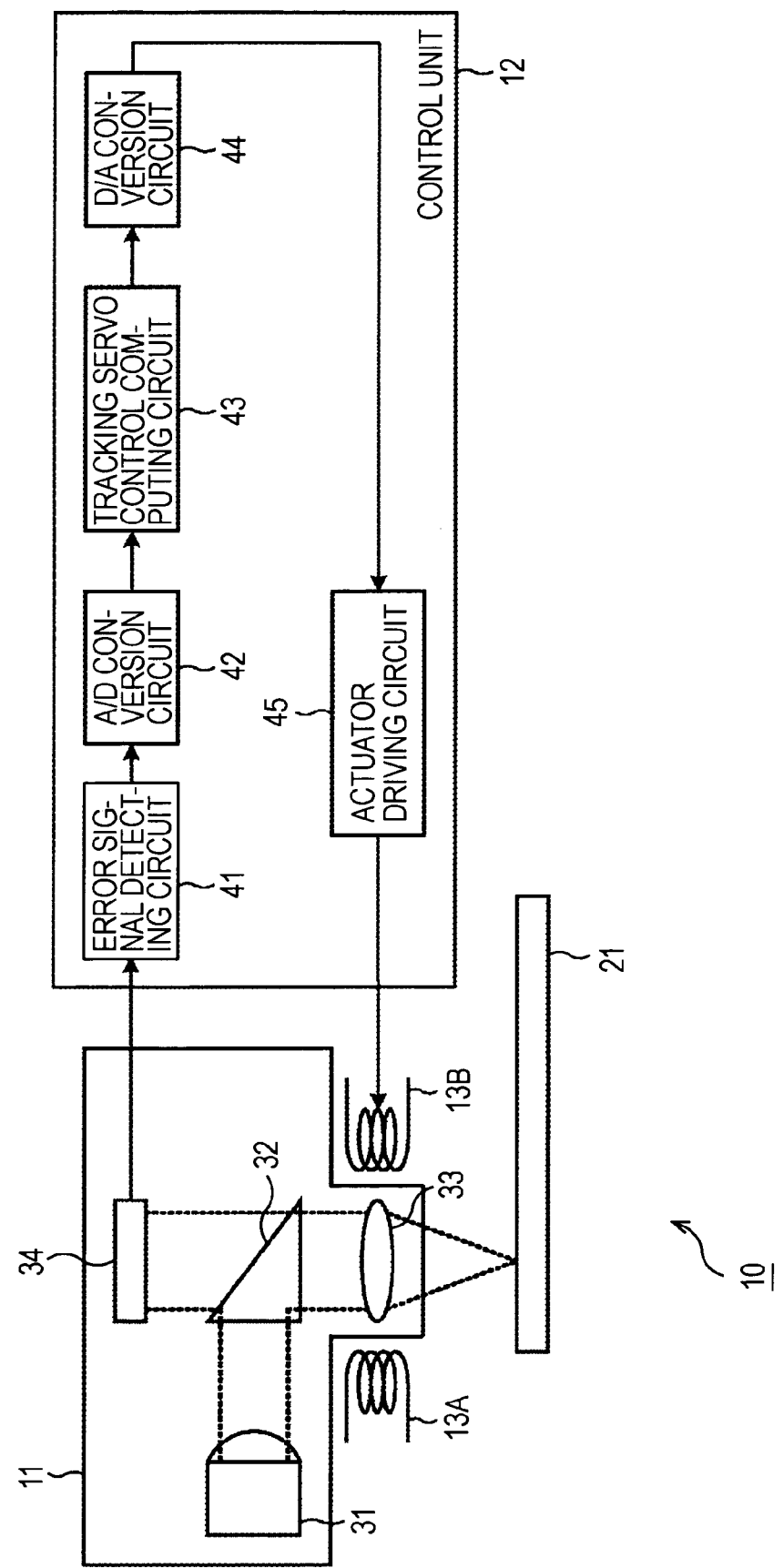
FIG. 1 is a block diagram illustrating a configuration example of an optical disc recording/reproducing device according to the related art.

FIG. 1 is a block diagram illustrating a principal configuration example of a tracking servo control system of an optical disc recording/reproducing device according to the related art. An optical disc recording/reproducing device 10 shown in FIG. 1 is a device which performs reading or writing of data as to an optical disc 21. The tracking servo control system of this optical disc recording/reproducing device 10 performs the servo control by following a circumferential track formed on the surface of the optical disc 21 which swings due to disc eccentricity or the like, and driving a lens unit 33 of a recording/reproducing element 11 in the horizontal direction with electromagnetic actuators 13A and 13B to condense laser on the track. As shown in FIG. 1, the optical disc recording/reproducing device 10 includes a recording/reproducing element 11, control unit 12, and electromagnetic actuators 13A and 13B.

The recording/reproducing element 11 to be controlled is an element which performs writing or reading of data as to the optical disc 21 which is a recording medium. The recording/reproducing element 11 includes a laser light source 31, light separating unit 32, lens unit 33, and light receiving unit 34. The recording/reproducing element 11 performs writing or reading of data by focusing a laser beam on each recording layer. The condensed position of the laser beam output from the recording/reproducing element 11 is controlled by the electromagnetic actuator 13A or 13B which is driven in accordance with the control of the control unit 12.

The laser beam emitted from the laser light source 31 is refracted by the light separating unit 32, and is focused on the recording face of the optical disc 21 by the lens unit 33. Also, the laser beam thereof is reflected off the optical disc 21. The reflected light thereof is changed to parallel light by the lens unit 33, and is guided to the light receiving unit 34. The light receiving unit 34 receives the return light thereof, and subjects this to photoelectric conversion, and supplies the obtained error signal to the control unit 12.

The control unit 12 includes an error signal detecting circuit 41, A/D conversion circuit 42, tracking servo control computing circuit 43, D/A conversion circuit 44, and actuator driving circuit 45. The error signal supplied from the light receiving unit 34 is detected by the error signal detecting circuit 41, supplied to the A/D conversion circuit 42 as a tracking error signal which is proportional to shift quantity between a laser condensed position and a track center, and subjected to A/D (Analog/Digital) conversion. The digitized tracking error signal (hereafter, also referred to as "digital tracking error signal") is supplied to the tracking servo control computing circuit 43. The tracking servo control computing circuit 43 performs predetermined control calculation regarding the digital tracking error signal thereof to generate a control signal which is a digital signal for performing control so as to reduce the tracing error (hereafter, referred to as "digital control signal"). The generated digital control signal is subjected to D/A (Digital/Analog) conversion at the D/A conversion circuit 44, and supplied to the actuator driving circuit 45 as an analog-converted control signal (hereafter, referred to as "analog control signal"). The actuator driving circuit 45 drives the electromagnetic actuators 13A and 13B to perform the position control of the lens unit 33 in the horizontal direction as to the recording face of the optical disc 21 based on the analog control signal thereof.

The lens unit 33 is moved in the horizontal direction as to the recording face of the optical disc 21 by the electromagnetic actuators 13A and 13B so as to reduce the error signal. The lens unit 33 has lightness in weight, and is capable of high-speed driving, so the optical disc recording/reproducing device 10 can basically have this tracking servo follow the condensed position as to track direction position shift due to disc eccentricity.

Description will be made below regarding an example wherein, with the control system such as shown in FIG. 1, when a laser beam is reflected on the recording face of the optical disc 21 as an error signal, a push-pull signal is employed, which is obtained from a portion where ± first order and zero order generated from the track provided on the recording face are overlapped, to perform initial value compensation at the time of track jumping.

Figure 2:
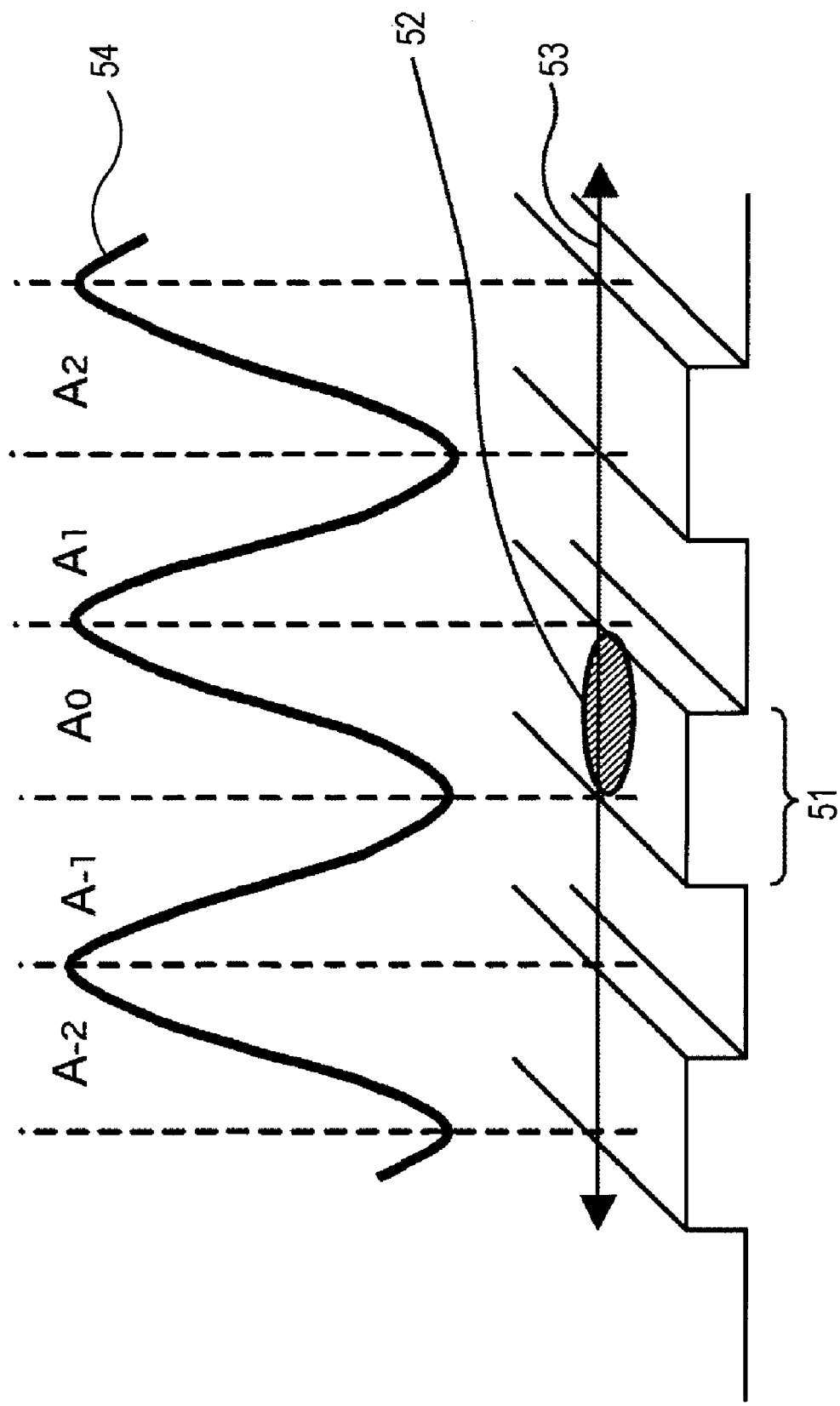
FIG. 2 is a diagram describing an example of a push-pull signal.

Description will be made first regarding the push-pull signal. The push-pull signal at the time of a spot condensed by the lens unit 33 traversing multiple tracks becomes generally such as shown in FIG. 2. A range shown in $A_0$ in FIG. 2 is employed as a detection region. At regions $A_1$ and $A_{-1}$ adjacent to the detection region the polarity turns to the opposite, and the inclination of the signal is inverted. Further, the outer sides $A_2$ and $A_{-2}$ thereof become the detection regions of the adjacent tracks.

Figure 3:
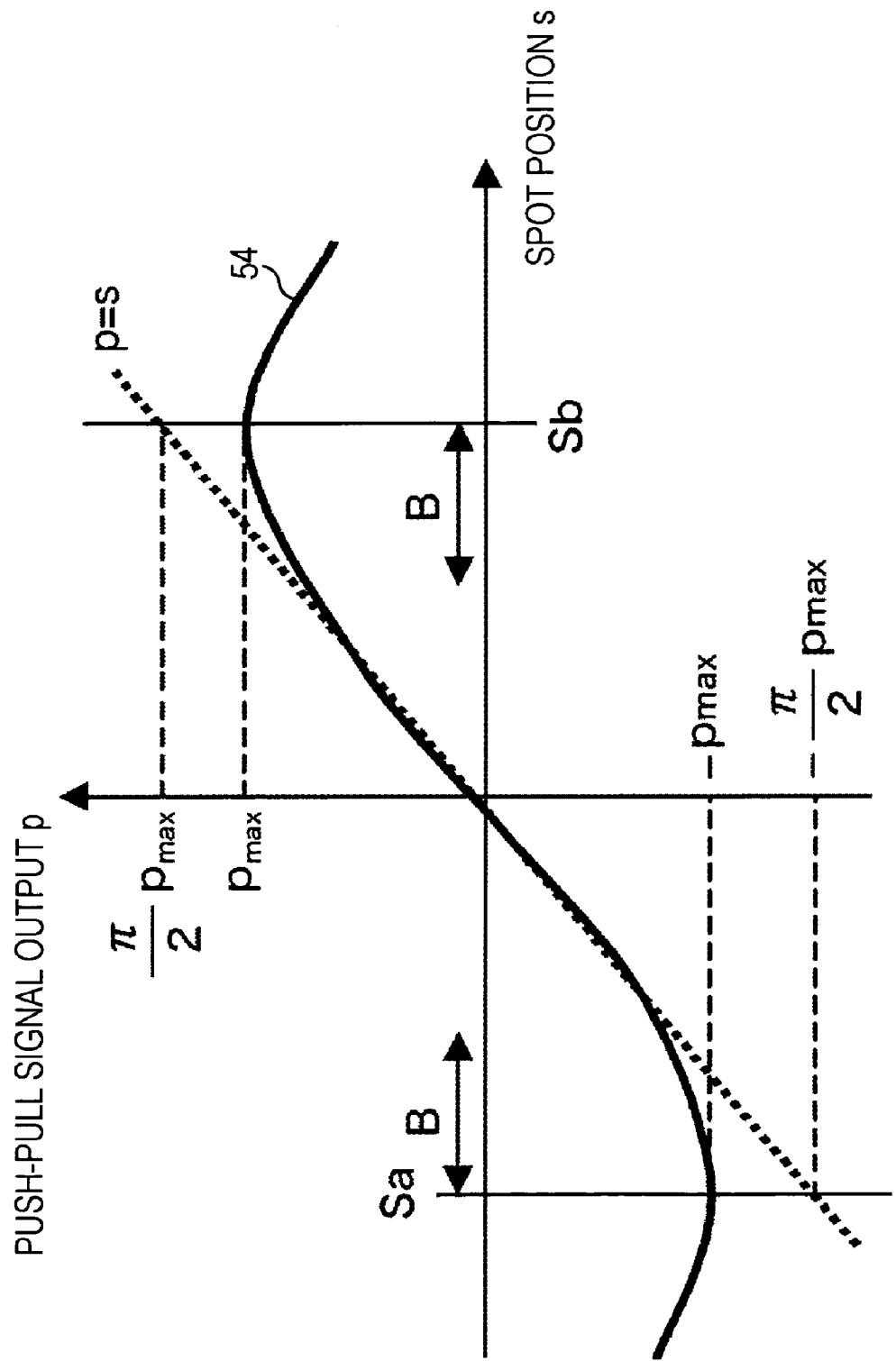
FIG. 3 is an enlarged view of the push-pull signal shown in FIG. 2.

Upon a spot 52 positioned over the current track 51 moving in the horizontal direction such as shown in both arrows 53, a push-pull signal 54 becomes a vibration wave such as a sine function as shown in FIG. 2. FIG. 3 enlarges the push-pull signal 54 within the detection region $A_0$ thereof. When comparing a relative position s between the track 51 and spot 52, and output p of the push-pull signal 54, the waveform of the push-pull signal 54 can be regarded as a rough linear curve at the center portions in the detection regions. That is to say, the movement distance of the spot 52 is generally proportional to the value of the push-pull signal output p. On the other hand, the difference between the movement distance of the spot 52 and the push-pull signal output p increases at the regions in the vicinity of the edges of the detection regions. That is to say, it becomes difficult to consider that the movement distance of the spot 52 is proportional to the value of the push-pull signal output p. In general, the push-pull signal p approximates to the sine function of the relative position s such as the following Expression (1).

$$p = p_{max} \sin\left(\frac{s}{p_{max}}\right) \quad (1)$$

$$\left(-\frac{\pi}{2} p_{max} < s < \frac{\pi}{2} p_{max}\right)$$

In a case where the accurate value of the relative position s has to be calculated from the push-pull signal s, for example, back-calculation is performed such as shown in the following Expression (2).

$$s = p_{max} \sin^{-1}\left(\frac{p}{p_{max}}\right) \quad (2)$$

$$(-p_{max} < p < p_{max})$$

Figure 4:
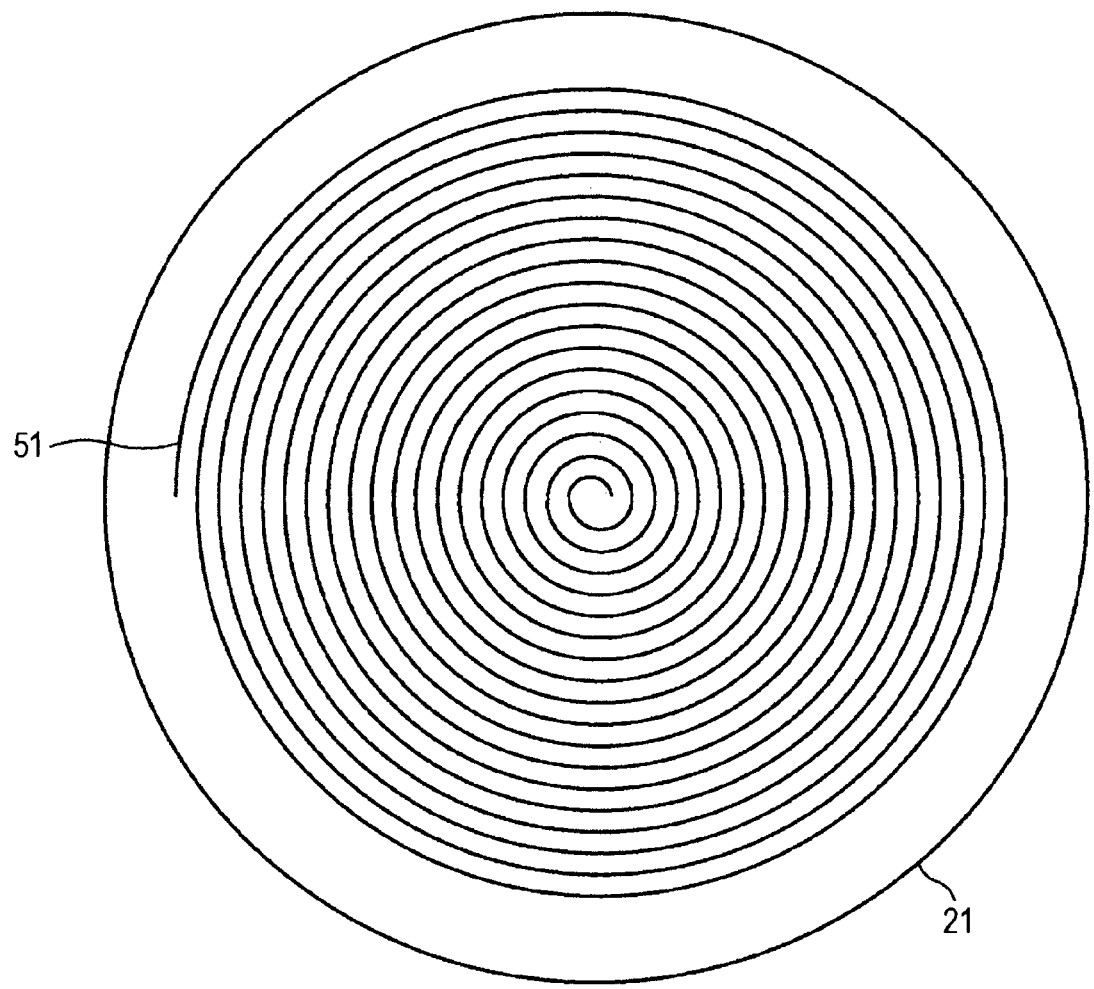
FIG. 4 is a diagram describing an example of the situation of tracks formed on an optical disc.
Figure 5:
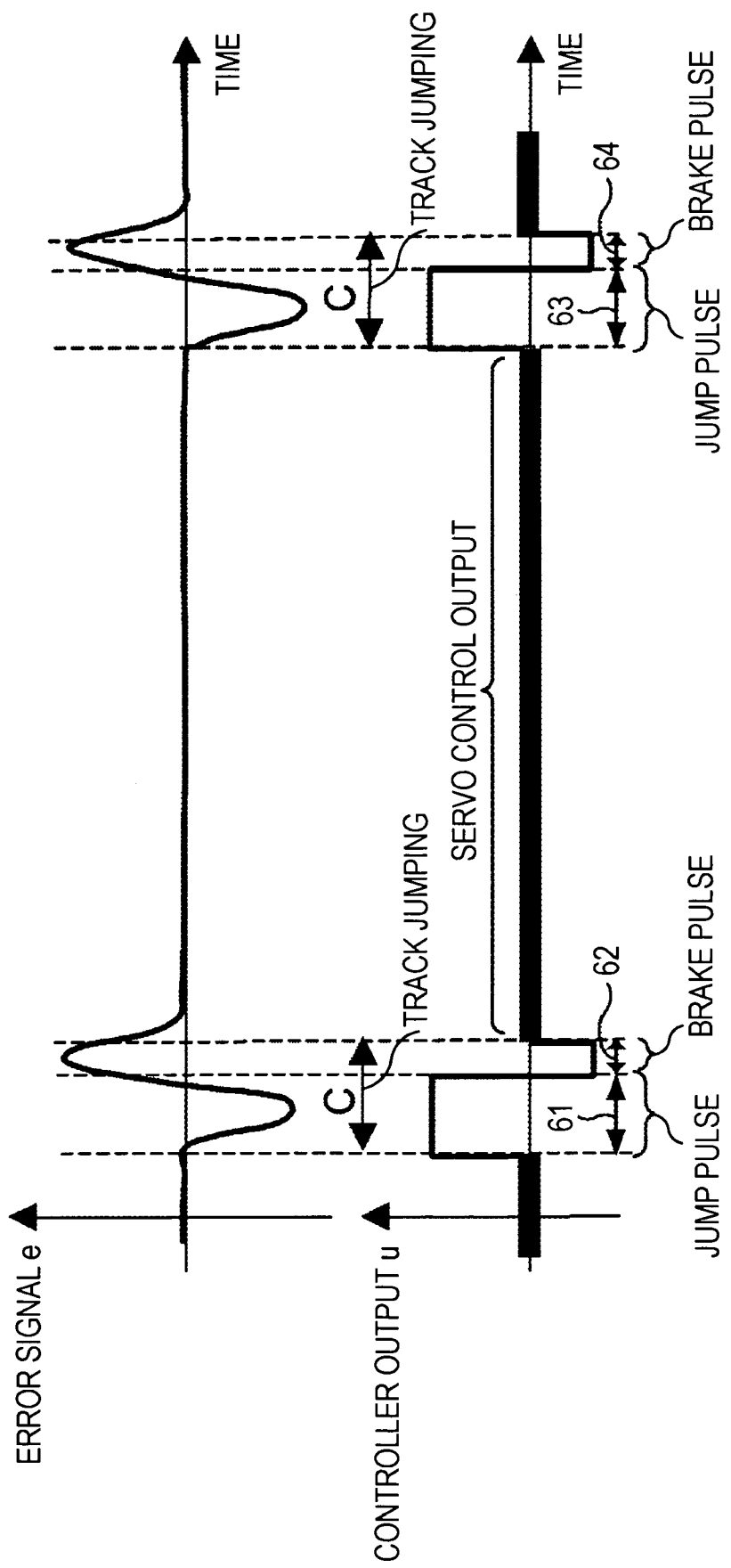
FIG. 5 is a diagram illustrating an example of the situation of an error signal and controller output at the time of track jumping.

Next, track jumping will be described. With the optical disc 21, in general, as shown in FIG. 4, a track 51 is formed in a spiral shape from the inner circumference to the outer circumference. Accordingly, with a still operation wherein the same track (one round worth of track) is reproduced repeatedly, track jumping has to be performed once per one round, thereby moving the spot 52 to the inner circumference (having the spot 52 perform track jumping). FIG. 5 is a diagram illustrating an example of a situation of an error signal e and controller output u at the time of track jumping thereof. As shown in FIG. 5, with a track jumping period shown in both arrows C, the servo controller does not perform a servo control operation, outputs a jump pulse during a period 61, and outputs a brake pulse during a period 62. Thus, the spot 52 is forcibly moved to a track adjacent to the inner circumferential side. At this time, the spot 52 passes through the outside of the detection region, and the error signal e has the opposite inclination, and accordingly, as shown in FIG. 5, the waveform of the error signal e becomes a diphasic waveform having peaks upward and downward. Upon the spot 52 moving to the adjacent track, a servo control operation is started again. Starting a servo control operation at the time of the spot 52 reaching the detection region center increases overshoot, so in general, as shown in FIG. 5, a servo control operation is frequently started at a position where the error signal e takes a certain degree of great value. That is to say, a servo control operation is started at a region where the difference as to the relative position s is great.

As described above, a servo control operation is started for each track jumping at the time of a still operation wherein the same track is reproduced, and in a case where the push-pull signal is employed as an error signal, and a servo control operation is frequently started at a region where the difference as to the relative position s is great.

Figure 6:
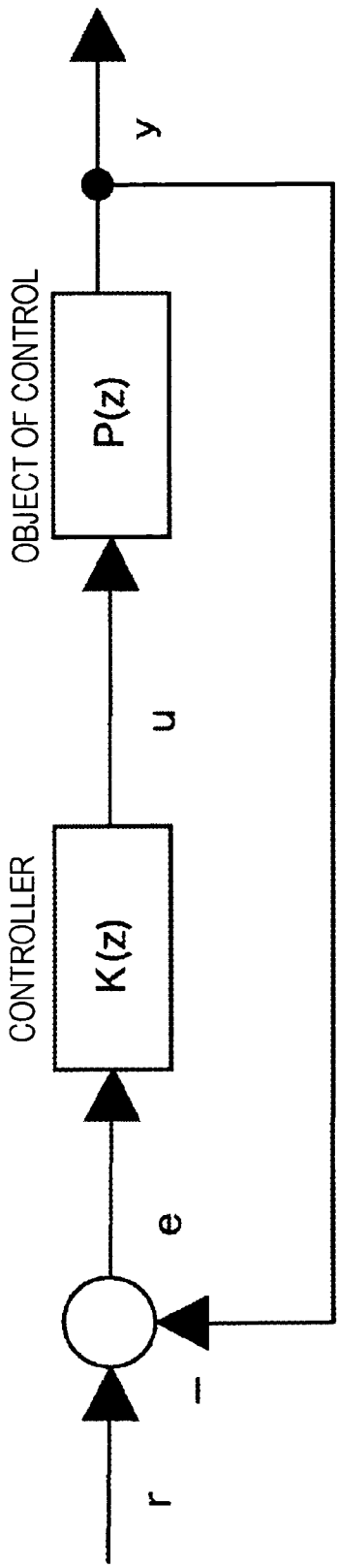
FIG. 6 is a block diagram illustrating another example of a digital control model.
Figure 7:
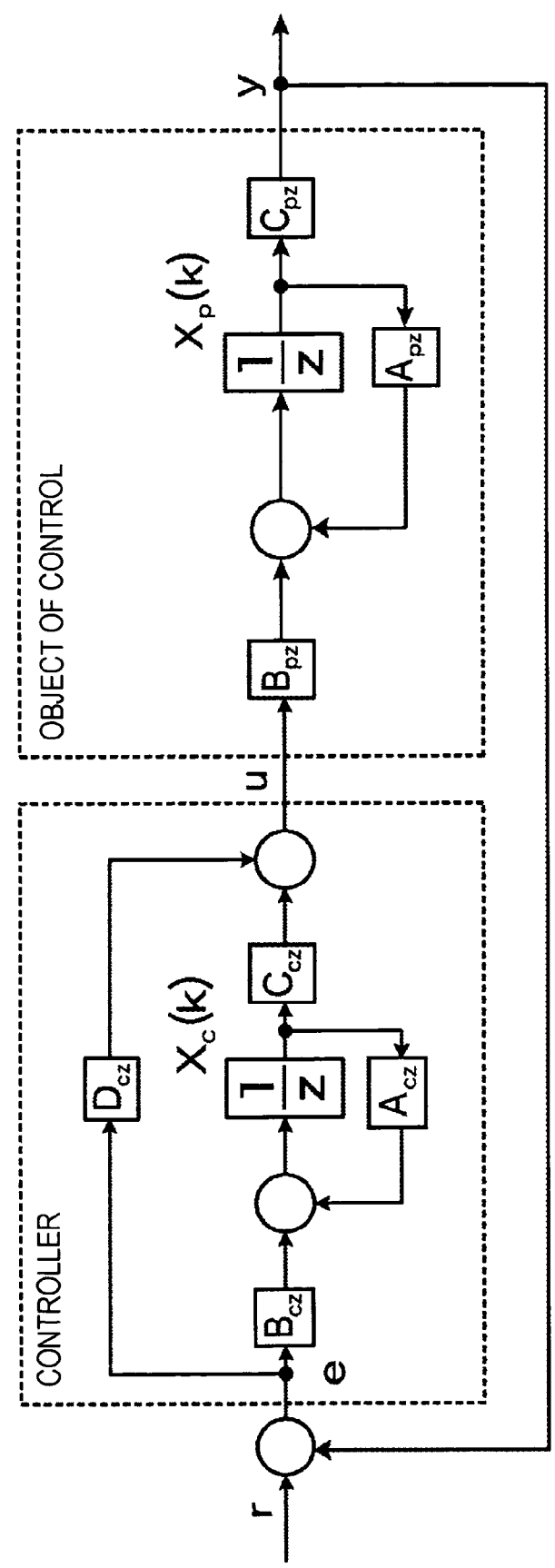
FIG. 7 is a diagram representing the control model shown in FIG. 6 with a status spatial expression.

Next, initial value compensation will be described. The digital control system of the optical disc recording/reproducing device 10 such as shown in FIG. 1 is generally represented with the block diagram shown in FIG. 6. In FIG. 6, K(z) represents a servo controller, and P(z) represents the operation of an object of control (actuator). FIG. 7 is a diagram representing each of the controller K(z) and object of control P(z) of this control system by employing status spatial expressions. The overall control system is represented with status spatial expressions, such as shown in the following Expressions (3) and (4).

$$\begin{bmatrix} X_{cz}(k+1) \\ X_{pz}(k+1) \end{bmatrix} = \begin{bmatrix} A_{cz} & -B_{cz} \cdot C_{pz} \\ B_{pz} \cdot C_{cz} & A_{pz} - B_{pz} \cdot D_{cz} C_{pz} \end{bmatrix} \begin{bmatrix} X_{cz}(k) \\ X_{pz}(k) \end{bmatrix} + \begin{bmatrix} B_{cz} \\ B_{pz} \cdot D_{cz} \end{bmatrix} r(k) \quad (3)$$
$$\equiv A_z \cdot X_{mz}(k) + B_z \cdot r(k)$$

$$y(k) = \begin{pmatrix} 0 & C_{pz} \end{pmatrix} \begin{bmatrix} X_{cz}(k) \\ X_{pz}(k) \end{bmatrix} \quad (4)$$
$$\equiv C_z \cdot X_{mz}(k)$$

Initial value vectors representing the initial values of the controller and object of control are represented with the following Expression (5) in which $X_{cz}(0)$ denotes the initial value of the controller, and $X_{pz}(0)$ denotes the initial value of the object of control. That is to say, the initial vectors become the initial value compensation values of this control system.

$$\text{Initial value vectors} = \begin{bmatrix} X_{cz}(0) \\ X_{pz}(0) \end{bmatrix} \quad (5)$$

At this time, a transfer function between an actuator position y of the control system and the initial value vectors is represented with Expression (6).

$$y = C_z \cdot (zI - A_z)^{-1} \cdot z \cdot \begin{pmatrix} X_{cz}(0) \\ X_{pz}(0) \end{pmatrix} \quad (6)$$

With initial value compensation, the initial value $X_{cz}(0)$ of the controller is given with a function of the initial value $X_{pz}(0)$ of the object of control, such as shown in the following Expression (7).

$$X_{cz}(0) = \alpha X_{pz}(0) \quad (7)$$

Thus, the transfer function of Expression (6) can be changed, and accordingly, a desired initial value response can be given to the above-mentioned control system.

In general, with the controller of a disc device, as shown in FIG. 6, a second order filter made up of a low-frequency emphasis filter and a high-frequency phase advance filter. The above Expression (7) is specifically represented such as the following Expression (8) in which the register value of the low-frequency emphasis filter is $x_L(k)$, the register value of the high-frequency phase advance filter is $x_H(k)$, and the states of the actuator which is an object of control are a position $x(k)$ and speed $v(k)$.

$$\begin{pmatrix} x_L(0) \\ x_H(0) \end{pmatrix} = \begin{pmatrix} k_{11} & k_{12} \\ k_{21} & k_{22} \end{pmatrix} \begin{pmatrix} x(0) \\ v(0) \end{pmatrix} \quad (8)$$

As shown in Expression (8), $\alpha$ of Expression (7) can be represented with a matrix, so this $\alpha$ will be referred to as an initial value compensation matrix.

Further, $\{C_z \cdot (zI - A_z)^{-1} \cdot z\}$ within Expression (6) is written specifically such as the following Expression (9).

$$C_z \cdot (zI - A_z)^{-1} \cdot z \equiv \frac{1}{\det(zI - A_z)} (\omega_1(z) \quad \omega_2(z) \quad \omega_3(z) \quad \omega_4(z)) \quad (9)$$

According to the above Expressions (7) through (9), the transfer function can be represented with the following Expression (10).

$$y = \frac{1}{\det(zI - A_z)} (\omega_1(z) \quad \omega_2(z) \quad \omega_3(z) \quad \omega_4(z)) \begin{pmatrix} \alpha \\ 1 \end{pmatrix} X_{pz}(0) \quad (10)$$
$$= \frac{\begin{pmatrix} \omega_1(z) k_{11} + \omega_2(z) k_{21} + \omega_3(z) \\ \omega_1(z) k_{12} + \omega_2(z) k_{22} + \omega_4(z) \end{pmatrix} \begin{pmatrix} x(0) \\ v(0) \end{pmatrix}}{\det(zI - A_z)}$$

According to Expression (10), it can be understood that the initial value response y is determined by the root of the denominator expression which is the pole of the control system, and the root of the numerator expression which is equivalent to the zero point of Expression (10). Therefore, the position of the zero point is adjusted by changing the values of the coefficients $k_{11}$, $k_{12}$, $k_{21}$, and $k_{22}$ of these expressions, whereby the satisfactory initial value response y can be obtained.

In general, the coefficients $k_{11}$, $k_{12}$, $k_{21}$, and $k_{22}$ are determined beforehand so as to cancel out a late pole or vibration point with the zero point, a servo control operation is performed with the $x_L(0)$ and $x_H(0)$ calculated with the above Expression (8) from the actuator position $x(0)$ and actuator speed $v(0)$ when the servo is turned on, as controller initial values.

Note that, with the common optical disc recording/reproducing device 10, a digitized error signal $e(k)$ between the object position and the actuator position is detected, but it is difficult to detect the actuator position $x(k)$ and actuator speed $v(k)$.

Therefore, let us say that the digitized error signal $e(k)$ which corresponds to the relative position between the object position and the actuator position is employed instead of the actuator position $x(k)$. Also, digitized relative speed $e_v(k)$ between the object position and the actuator position is represented with such as Expression (11) with sampling time as T.

$$e_v(k) = \frac{e(k) - e(k-1)}{T} \quad (11)$$

In the event of employing this digitized relative speed $e_v(k)$ between the object position and the actuator position instead of the actuator speed $v(k)$, the above Expression (8) can be represented with such as the following Expression (12). An initial value compensation value can be calculated from the digitized error signal $e(k)$ between the object position and actuator position by employing Expression (12).

$$\begin{pmatrix} x_L(0) \\ x_H(0) \end{pmatrix} = \begin{pmatrix} k_{11} & k_{12} \\ k_{21} & k_{22} \end{pmatrix} \begin{pmatrix} e(0) \\ e_v(0) \end{pmatrix} \quad (12)$$

Figure 8:
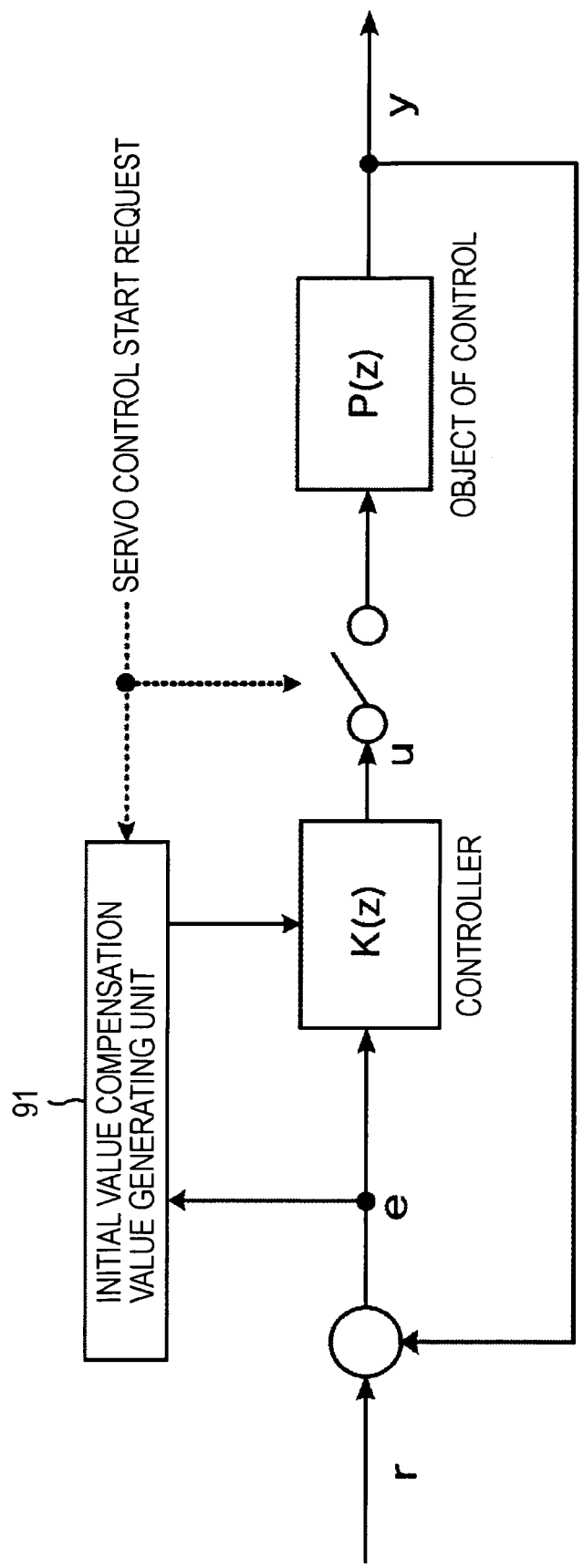
FIG. 8 is a block diagram of a control system including an initial value compensation value generating unit.

FIG. 8 is a block diagram of the control system including an initial value compensation value generating unit for realizing such initial value compensation. Specifically, the control system shown in FIG. 8 is a control system obtained by adding an initial value compensation value generating unit 91 to the control system shown in FIG. 6. The operation of this control system will be described here. The digitized error signal e(k) is input to the initial value compensation value generating unit 91, there digitized relative speed $e_v(k)$ is generated in accordance with Expression (11). An initial value compensation value is calculated in accordance with Expression (12) to set this in the controller K(z) wherein the value of the digitized error signal is e(0), and the value of the digitized relative speed is $e_v(0)$, when a servo control start request is received. Simultaneously, a switch connected to the controller output is turned on in accordance with the servo control start request, and a servo control operation is started with the calculated initial value compensation value as a controller initial value.

In a case where such initial value compensation is performed at the time of start of the servo control after track jumping, a servo control operation is frequently started at a position where the error signal e takes a certain degree of a great value as described above. As shown in the graph in FIG. 3, if the push-pull signal p employed as the error signal e takes a certain degree of great value, the error with the relative position s increases in some cases. In the event of a servo control operation being started in such a region, the relative position and relative speed of the spot detected by the push-pull signal p as to the object position decrease as compared to the actual position and speed, and accordingly, the advantage of initial value compensation is not sufficiently obtained in some cases.

In order to suppress occurrence of such a situation, an arrangement can be conceived wherein the obtained push-pull signal value p is subjected to correction of the above Expression (2) within a one sampling period. However, the load of calculating the inverse trigonometric function of Expression (2) is great, and accordingly, it is difficult to perform this calculation within one sampling period. Also, there are possibilities such as increase in a circuit scale, and increase in development costs and manufacturing costs.

Therefore, with the present invention, an arrangement is made wherein the ratio $K_p$ between the relative position s and push-pull signal p at a position where a servo control operation is started is calculated beforehand, and this correction coefficient $K_p$ is employed to correct the digitized error signal e(0) and digitized relative speed ev(0) in a simple manner. Thus, the simply corrected initial value compensation value is calculated, and an advantage more similar to assumption can be obtained.

Figure 9:
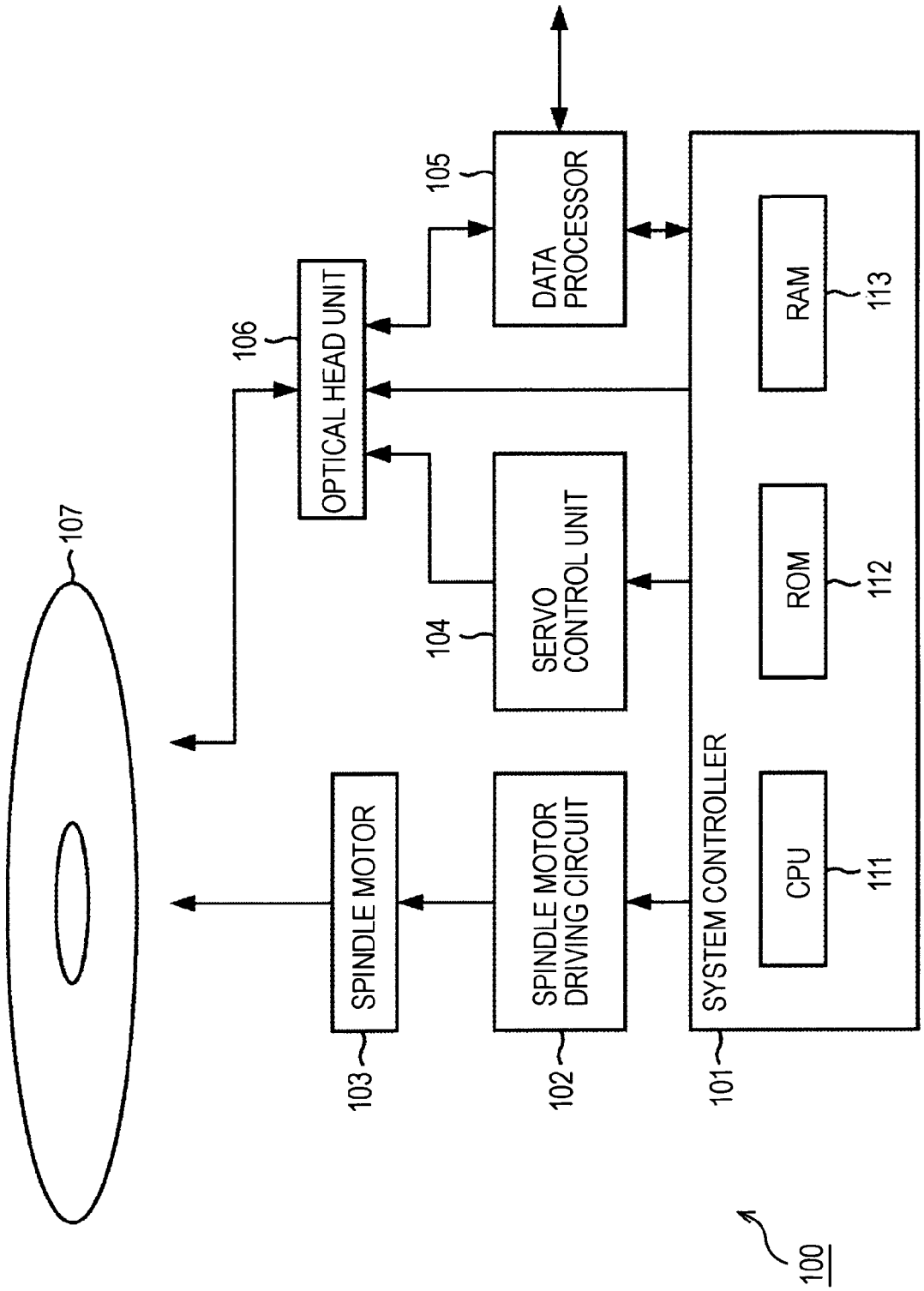
FIG. 9 is a block diagram illustrating a principal configuration example of an optical disc recording/reproducing device to which an embodiment of the present invention has been applied.

This arrangement will be described below in detail. FIG. 9 is a block diagram illustrating a principal configuration example of the optical disc recording/reproducing device to which an embodiment of the present invention has been made. The optical disc recording/reproducing device 100 shown in FIG. 9 is a device which performs reading and writing of information as to an optical disc 107 mounted on a predetermined position. The optical disc recording/reproducing device 100 includes a system controller 101, spindle motor driving circuit 102, spindle motor 103, servo control unit 104, data processor 105, and optical head unit 106.

The system controller 101 is a control unit which controls the operation of each unit within the optical disc recording/reproducing device 100. A CPU (Central Processing Unit) 111 of the system controller 101 executes various types of processing in accordance with a program stored in ROM (Read Only Memory) 112 or program loaded into RAM (Random Access Memory) 113. The RAM 113 also stores data for the CPU 111 executing various types of processing, and so forth as appropriate.

The spindle motor driving circuit 102, which is controlled by the system controller 101, controls the rotation of the spindle motor 103 for rotating the optical disc 107. The servo control unit 104, which is controlled by the system controller 101, controls the condensed position of an optical pickup (optical head unit 106). The data processor 105, which is controlled by the system controller 101, performs information processing with information read out by the optical disc 107, or information written in the optical disc 107 as an object of processing. The optical head unit 106, which is controlled by the system controller 101, irradiates a laser beam to the optical disc 107 to read out or write information.

Figure 10:
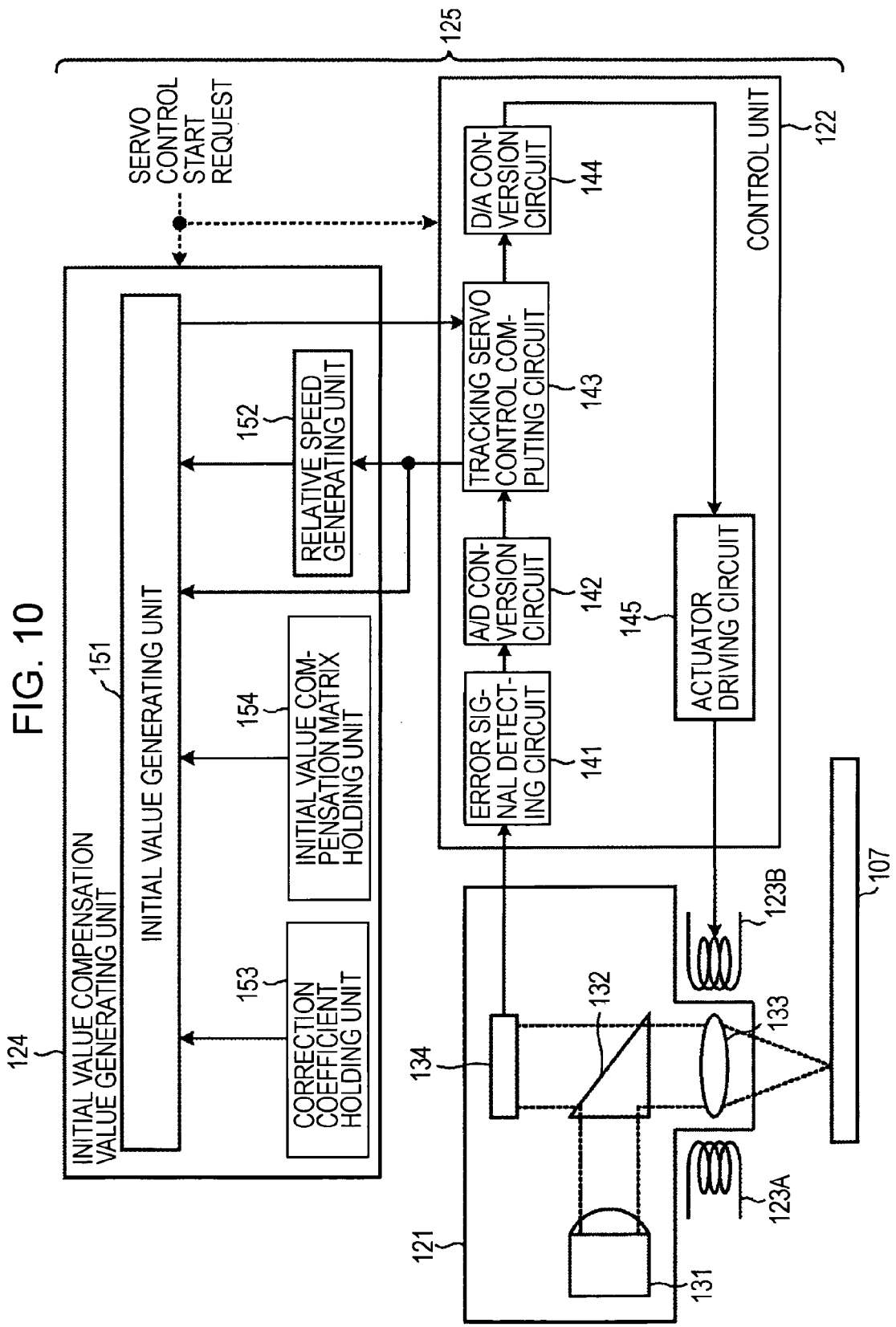
FIG. 10 is a block diagram illustrating a detailed example of a configuration relating to pickup position control.

FIG. 10 is a block diagram illustrating a detailed example of the configuration relating to the position control of the pickup, of the various configurations of the optical disc recording/reproducing device 100 shown in FIG. 9. As shown in FIG. 10, the optical disc recording/reproducing device 100 includes a recording/reproducing element 121, control unit 122, electromagnetic actuators 123A and 123B, and initial value compensation value generating unit 124.

The recording/reproducing element 121 is an element which performs writing or reading of data as to the optical disc 107 which is a recording medium. The recording/reproducing element 121 performs writing or reading of data by focusing a laser beam on each recording layer of the optical disc 107 to be subjected to rotation operations. Therefore, the control unit 122 employs the electromagnetic actuators 123A and 123B to control the condensed position of the laser beam output from the recording/reproducing element 121 in the horizontal direction as to the recording face of the optical disc 107.

The recording/reproducing element 121 performs reading or writing of data by irradiating a laser beam to the optical disc 107, and generates an error signal to supply this to the control unit 122 by detecting the return light reflected off the recording face of the optical disc 107. The control unit 122 controls the electromagnetic actuators 123A and 123B based on the error signal thereof.

The recording/reproducing element 121 includes a laser light source 131, light separating unit 132, lens unit 133, and light receiving unit 134. The laser light source 131 emits a laser beam having a predetermined wavelength toward the light separating unit 132. The light separating unit 132 refracts the laser beam emitted from the laser light source 131 to guide this to the optical disc 107 side (lens unit 133), and also transmits the laser beam reflected off the optical disc 107 to guide this to the light receiving unit 134. The lens unit 133 condenses the laser beam from the light separating unit 132 to focus this on each recording layer of the optical disc 107, and also changes the return light from the optical disc 107 to parallel light to supply this to the light separating unit 132. The light receiving unit 134 is made up of a photoelectric conversion element employing, for example, a CMOS (Complementary Metal Oxide Semiconductor) sensor, CCD (Charge Coupled Device), or the like. The light receiving unit 134 receives the return light from the optical disc 107 supplied through the light separating unit 132 to subject this to photoelectric conversion, and supplies the obtained error signal to the control unit 122.

Note that FIG. 10 illustrates the single laser light source 131, single light separating unit 132, single lens unit 133, and single light receiving unit 134 respectively, but the number of each unit may be two or more. Also, the position relation of each unit shown in FIG. 10 is an example, and accordingly, each unit may be disposed in any way. It goes without saying that the shape and size of each unit are arbitrary.

The control unit 122 includes an error signal detecting circuit 141, A/D conversion circuit 142, tracking servo control computing circuit 143, D/A conversion circuit 144, and actuator driving circuit 145. The error signal detecting circuit 141 detects the error signal generated at the light receiving unit 134, thereby generating a tracking error signal to supply this to the A/D conversion circuit 142. The A/D conversion circuit 142 subjects the tracking error signal generated at the error signal detecting circuit 141 to A/D conversion, and supplies the digitized tracking error signal (hereafter, also referred to as "digital tracking error signal") to the tracking servo control computing circuit 143.

The tracking servo control computing circuit 143 performs predetermined control computation regarding the digital tracking error signal supplied from the A/D conversion circuit 142 to generate a control signal which is a digital signal (hereafter, referred to as "digital control signal") for performing control so as to reduce a tracking error. The tracing servo control computing circuit 143 employs the initial value compensation value supplied from the initial value compensation value generating unit 124 to perform this control computation to generate a digital control signal, and supplies this to the D/A conversion circuit 144. The D/A conversion circuit 144 subjects the digital control signal supplied from the tracking servo control computing circuit 143 to D/A conversion to supply the analog-converted control signal (hereafter, referred to as "analog control signal") to the actuator driving circuit 145. The actuator driving circuit 145 drives the electromagnetic actuators 123A and 123B based on the analog signal supplied from the D/A conversion circuit 144.

The electromagnetic actuators 123A and 123B control the position in the horizontal direction as to the recording face of the optical disc 107, of the recording/reproducing device 121, in accordance with the control signal supplied from the control unit 122. Hereafter, in a case where description does not have to be made distinguishing the electromagnetic actuators 123A and 123B one from another, these are collectively referred to as "actuator 123".

The initial value compensation value generating unit 124 is a processing unit for generating an initial value compensation value to be provided to the tracking servo control computing circuit 143. The initial value compensation value generating unit 124 includes an initial value generating unit 151, relative speed generating unit 152, correction coefficient holding unit 153, and initial value compensation matrix holding unit 154.

The initial value generating unit 151 calculates an initial value compensation value within one sampling period based on the digitized error signal e(0) at the time of a servo control start request being received, which is supplied from the tracking servo control computing circuit 143, the digitized relative speed $e_v(0)$ at the time of a servo control start request being received, which is supplied from the relative speed generating unit 152, and the correction coefficient $K_p$ supplied from the correction coefficient holding unit 153, and the initial value compensation matrix α supplied from the initial value compensation matrix holding unit 154, and supplies this to the tracking servo control computing circuit 143.

The relative speed generating unit 152 calculates a digitized relative speed $e_v(0)$ at the time of a servo control start request being received, which is supplied from the tracking servo control computing circuit 143, and supplies this to the initial value generating unit 151.

The correction coefficient holding unit 153 holds the ratio $K_p$ between the relative position s and push-pull signal p at a position where a servo control operation is started, which is calculated beforehand, and supplies the ratio $K_p$ thereof to the initial value generating unit 151 based on a request from the initial value generating unit 151. The initial value compensation matrix holding unit 154 holds the initial value compensation matrix α, and supplies the initial value compensation matrix α thereof to the initial value generating unit 151 based on a request from the initial value generating unit 151.

This operation will be described in detail. Let us say that a servo control operation start signal level $p_s$ is the magnitude of the error signal when a servo control operation is started at the time of track jumping. The actual track jumping waveform varies depending on a subtle conditional difference at each time, so the actual servo control operation start signal level p(0) becomes a different value at each time, but let us say that a servo control operation start signal level $e_s$ here is a representative value based on the actual measured value such as the mean value of the actual servo control operation start signal level p(0), or a representative value to be derived logically. According to Expression (2), the original relative position $s_s$ corresponding to this servo control operation start signal level $p_s$ can be obtained such as shown in the following Expression (13).

$$s_s = p_{max}\sin^{-1}\left(\frac{p_s}{p_{max}}\right) \quad (13)$$

$$(-p_{max} < p_s < p_{max})$$

Now, let us say that the ratio between the $s_s$ and $p_s$ is $K_p$ such as shown in the following Expression (14).

$$K_p = \frac{s_s}{p_s} = \frac{p_{max}\sin^{-1}\left(\frac{p_s}{p_{max}}\right)}{p_s} \quad (14)$$

At this time, the push-pull signal can be corrected in the vicinity of $p_s$ approximately such as shown in Expression (15).

$$s(k) = K_p p(k) \quad (15)$$

Originally, it is desirable to set e(0)=S(0) at the time of calculating an initial value compensation value based on Expression (12), but actually, there is no method for measuring the relative position s itself, so the push-pull signal p is employed to set e(0)=P(0). In order to suppress the error between the relative position s(0) and push-pull signal p(0), it is logically desirable to employ the above Expression (2) to perform correction, but actually, this method is difficult from a point of view of a circuit scale or computation time as described above.

Therefore, the initial value generating unit 151 employs Expression (15) which is an approximation to suppress the error by setting $e(0)=K_p p(0)$. Similarly, by employing Expression (15), the relative speed $e_v(0)$ can be represented such as shown in the following Expression (16).

$$e_v(0) = \frac{s(0) - s(-1)}{T} \quad (16)$$
$$\approx \frac{K_p p(0) - K_p p(-1)}{T}$$
$$= K_p \frac{p(0) - p(-1)}{T} = K_p p_v(0)$$

This Expression (16) is applied to the above Expression (12), whereby an initial value compensation value can be represented such as the following Expression (17).

$$\begin{pmatrix} x_L(0) \\ x_H(0) \end{pmatrix} = \begin{pmatrix} k_{11} & k_{12} \\ k_{21} & k_{22} \end{pmatrix} \begin{pmatrix} e(0) \\ e_v(0) \end{pmatrix} \quad (17)$$
$$= \begin{pmatrix} k_{11} & k_{12} \\ k_{21} & k_{22} \end{pmatrix} \begin{pmatrix} K_p p(0) \\ K_p p_v(0) \end{pmatrix}$$

That is to say, as shown in Expression (17), the initial value generating unit 151 corrects the push-pull signal p(0) when a servo control start request is received, the relative speed $p_v(0)$ calculated from the push-pull signal p(0) at the relative speed generating unit 152 with the correction coefficient $K_p$ obtained from the correction coefficient holding unit 153 to calculate the digitized error signal e(0) and digitized relative speed $e_v(0)$. Subsequently, as shown in Expression (17), the initial value generating unit 151 employs the initial value compensation matrix α obtained from the initial value compensation matrix holding unit 154 to calculate an initial value compensation value (initial value vector) from the calculated digitized error signal e(0) and digitized relative speed $e_v(0)$.

The initial value generating unit 151 supplies the initial value compensation value thus calculated to the tracking servo control computing circuit 143.

An example of the flow of initial value compensation value generating processing having the above-mentioned content will be described with reference to the flowchart shown in FIG. 11. Upon receiving a servo control start request, the initial value compensation value generating unit 124 starts the initial value compensation value generating processing.

Upon the initial value compensation value generating processing being started, in step S1 the initial value generating unit 151 and relative speed generating unit 152 obtain the push-pull signal p(0) and p(−1) from the tracking servo control computing circuit 143. The p(0) is the value of the push-pull signal when a servo control start request is supplied, and the p(−1) is the value of the push-pull signal one sampling ahead thereof.

Description will be made here assuming that the tracking servo control computing circuit 143 holds the value of the past push-pull signal, the push-pull signals p(0) and p(−1) are supplied to the initial value generating unit 151 and relative speed generating unit 152 at timing wherein a servo control start request is supplied. It goes without saying that the tracking servo control computing circuit 143 may supply the push-pull signal p(k) to the initial value generating unit 151 and relative speed generating unit 152 for each sampling regardless of whether or not a servo control start request is supplied. In this case, the initial value generating unit 151 and relative speed generating unit 152 hold at least the push-signal one sampling ahead.

In step S2, the relative speed generating unit 152 employs the push-pull signals p(0) and p(−1) to calculate the relative speed $p_v(0)$ at the timing wherein a servo control start request is supplied in accordance with the above Expression (16).

In step S3, the initial value generating unit 151 reads out the correction coefficient $K_p$ from the correction coefficient holding unit 153, and in step S4 corrects the push-pull signal p(0) and relative speed $p_v(0)$ with the correction coefficient $K_p$ thereof in accordance with the above Expression (16).

Also, in step S5, the initial value generating unit 151 reads out the initial value compensation matrix α from the initial value compensation matrix holding unit 154, and in step S6 calculates an initial value compensation value from the initial value compensation matrix α, and the push-pull signal p(0) and relative speed $p_v(0)$ which have been corrected by the processing in step S4, in accordance with the above Expression (16) in step S6.

In step S7, the initial value generating unit 151 supplies the initial value compensation value calculated by the processing in step S6 to the tracking servo control computing circuit 143, and in step S8 causes the tracking servo control computing circuit 143 to start the servo control. Upon completing the processing in step S8, the initial value generating unit 151 ends the initial value compensation generating processing.

An initial value compensation value is obtained in such a way, whereby the initial value generating unit 151 can suppress influence due to the error even in a case where the push-pull signal initial value p(0) is relatively great, and the error as to the original relative position s(0) is great, and accordingly, a sufficient advantage of initial value compensation can be obtained with the control system. That is to say, the initial value generating unit 151 can readily calculate a more appropriate initial value compensation value, and provide this to the control system. In other words, the initial value compensation generating unit 124 can readily perform the initial value compensation of the control system in a more appropriate manner.

Note that description has been made so far wherein the initial value compensation value generating unit 124 calculates and holds the correction coefficient $K_p$ and initial value compensation matrix α beforehand, and at the time of a servo control start request, the initial value generating unit 151 employs the correction coefficient $K_p$ and initial value compensation matrix α thereof to generate an initial value compensation value, but the present invention is not restricted to this, for example, an arrangement may be made wherein the initial value compensation matrix α is corrected with the correction coefficient $K_p$ beforehand, and at the time of a servo control start request, an initial value compensation value is generated by the corrected initial value compensation matrix $α_1$.

The above Expression (17) can be transformed such as shown in the following Expression (18).

$$\begin{pmatrix} x_L(0) \\ x_H(0) \end{pmatrix} = \begin{pmatrix} k_{11} & k_{12} \\ k_{21} & k_{22} \end{pmatrix} \begin{pmatrix} K_p p(0) \\ K_p p_v(0) \end{pmatrix} \quad (18)$$
$$= \begin{pmatrix} k_{11} \cdot K_p & k_{12} \cdot K_p \\ k_{21} \cdot K_p & k_{22} \cdot K_p \end{pmatrix} \begin{pmatrix} p(0) \\ p_v(0) \end{pmatrix}$$
$$= α_1 \begin{pmatrix} p(0) \\ p_v(0) \end{pmatrix}$$

In Expression (17), the correction coefficient $K_p$ is multiplied by the initial value compensation matrix α. Specifically, the initial value compensation matrix α is corrected with the correction coefficient $K_p$, and the corrected initial value compensation matrix $α_1$ is calculated. As shown in Expression (17), the initial value generating unit 151 can readily calculate an initial value compensation value from the push-pull signal p(0) and relative speed $p_v(0)$ by employing such corrected initial value compensation matrix $α_1$. That is to say, the initial value generating unit 151 can reduce computation processing the load of computing an initial value compensation value at the time of a servo control start request.

Figure 12:
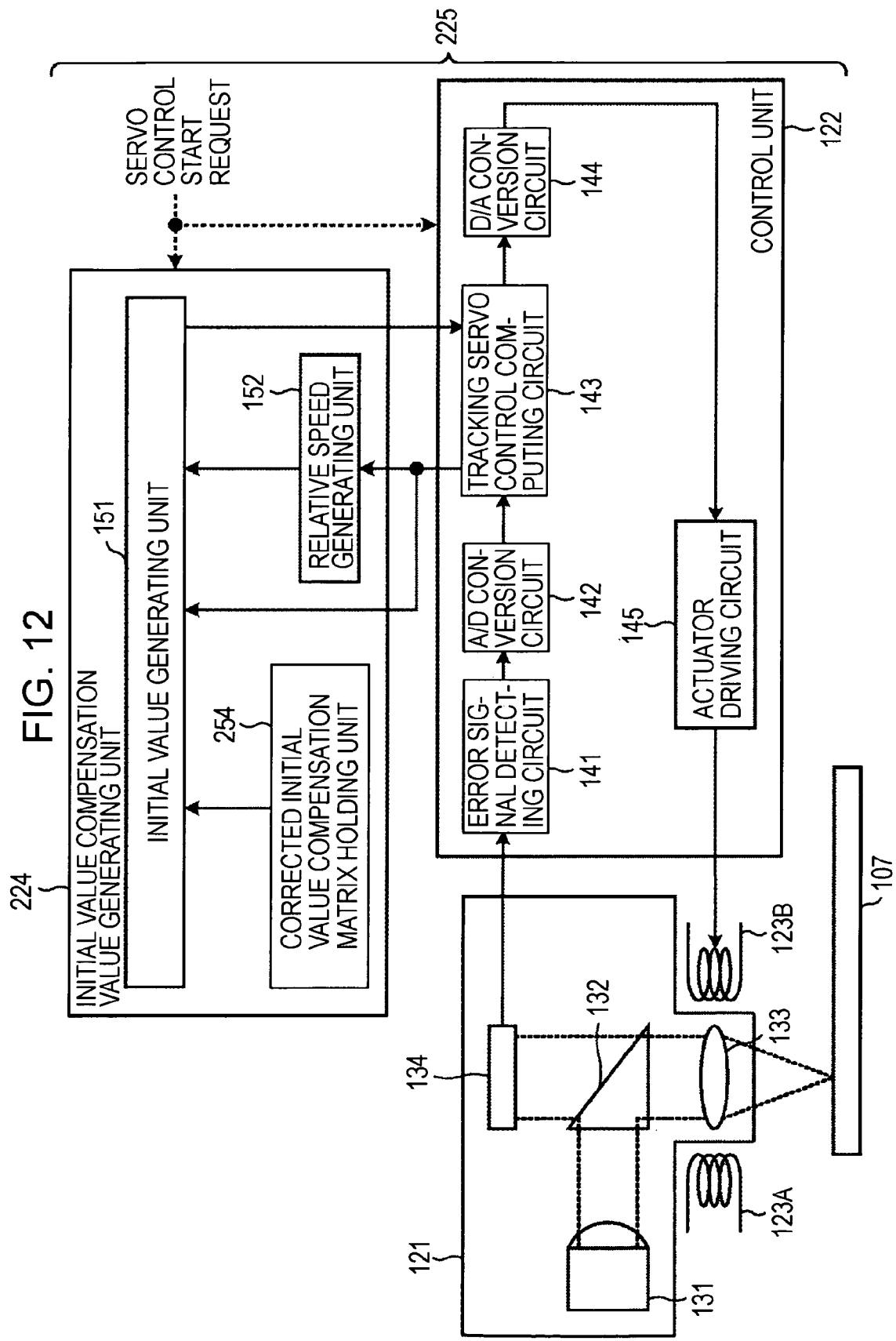
FIG. 12 is a block diagram illustrating another example of a configuration relating to pickup position control.

FIG. 12 is a block diagram illustrating a detailed example of the configuration relating to the position control of the pickup, of the relative configurations of the optical disc recording/reproducing device 100 shown in FIG. 9 in this case. That is to say, FIG. 12 is a diagram corresponding to FIG. 10. As shown in FIG. 12, the configuration of the control system in this case is basically the same in the case of FIG. 10, but includes an initial value compensation value generating unit 224 instead of the initial value compensation value generating unit 124 shown in FIG. 10.

The initial value compensation value generating unit 224 has basically the same configuration as the initial value compensation value generating unit 124 shown in FIG. 10, but includes a corrected initial value compensation matrix holding unit 254 instead of the correction coefficient holding unit 153 and initial value compensation matrix holding unit 154 shown in FIG. 10.

The corrected initial value compensation matrix holding unit 254 holds the corrected initial value compensation matrix $\alpha_1$ which has been calculated beforehand. The corrected initial value compensation matrix $\alpha_1$ is, as shown in the above Expression (18), obtained by multiplying the initial value compensation matrix $\alpha$ and correction coefficient $K_p$.

The initial value generating unit 151 can readily calculate an initial value compensation value from the push-pull signal p(0) and relative speed $p_v(0)$ at the time of a servo control start request by employing the corrected initial value compensation matrix $\alpha_1$.

Figure 13:
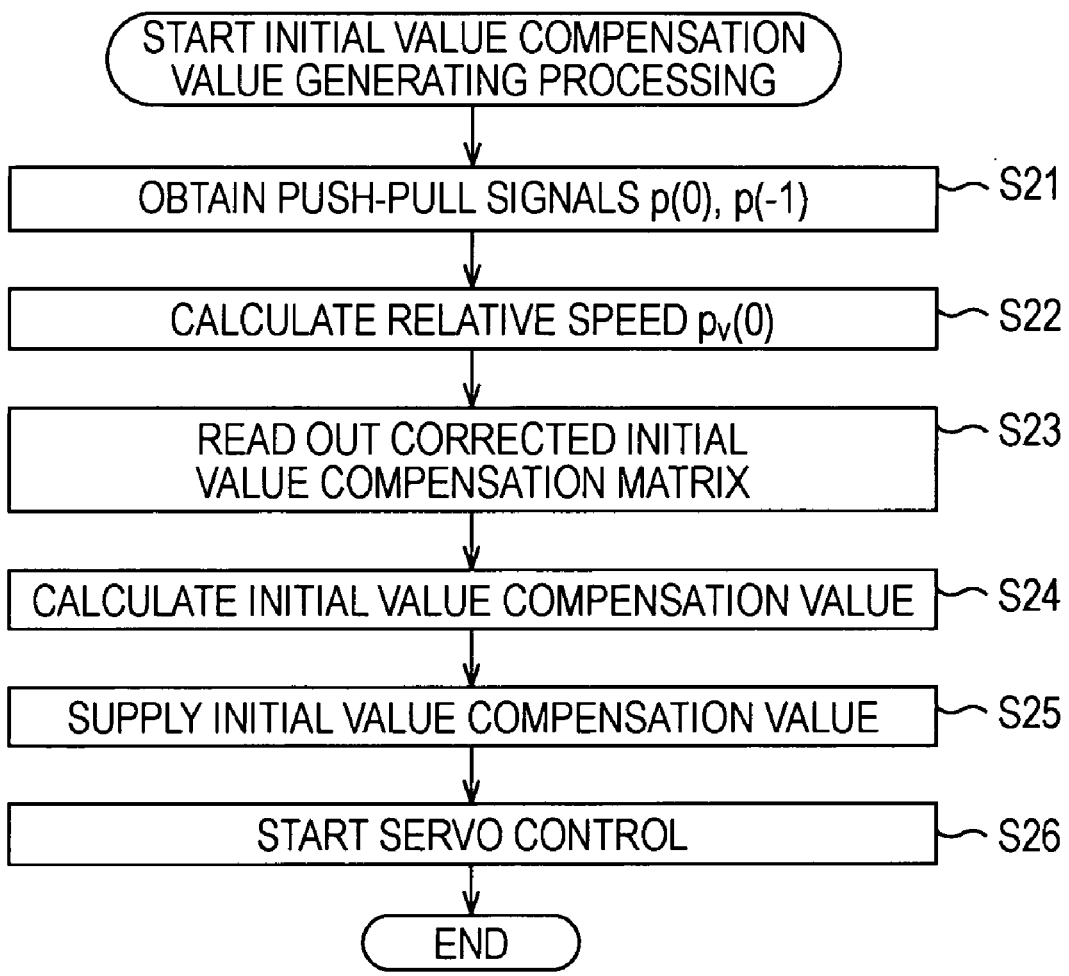
FIG. 13 is a flowchart describing another example of the initial value compensation generating processing.

An example of the flow of the initial value compensation value generating processing in this case will be described with reference to the flowchart shown in FIG. 13. In this case as well, each piece of processing is performed basically in the same way as in the case described with reference to the flowchart shown in FIG. 11.

Figure 11:
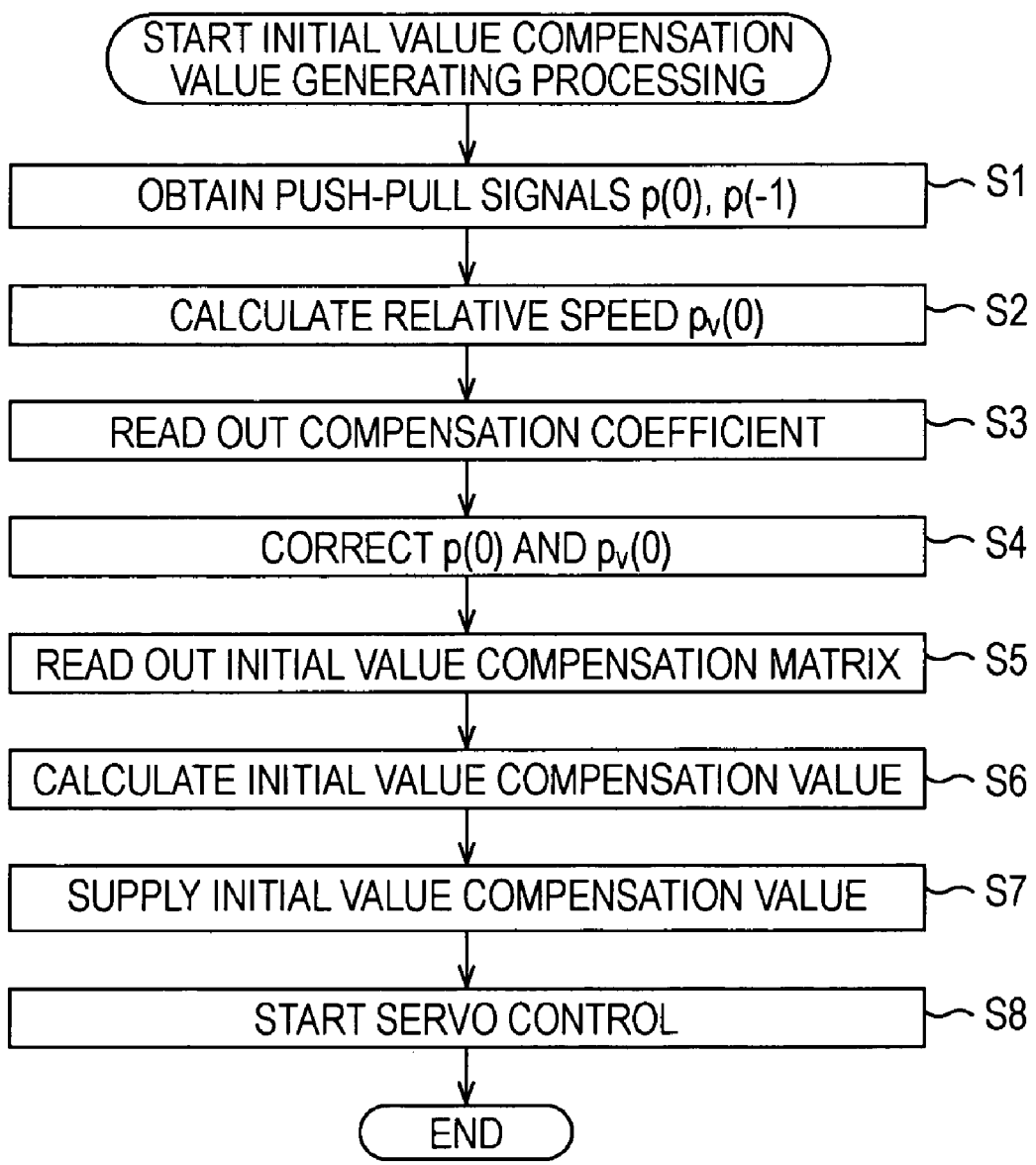
FIG. 11 is a flowchart describing an example of the flow of initial value compensation value generating processing.

Specifically, in step S21 the initial value generating unit 151 and relative speed generating unit 152 obtains the push-pull signals p(0) and p(−1) in the same way as in the case in step S1 in FIG. 11. In step S22, the relative speed generating unit 152 calculates the push-pull signals p(0) and p(−1), and relative speed $p_v(0)$ in the same way as in the case in step S2 in FIG. 11.

Unlike the case of steps S3 through S6 in FIG. 11, in step S23 the initial value generating unit 151 reads out the corrected initial value compensation matrix $\alpha_1$ from the corrected initial value compensation matrix holding unit 254, and in step S24 employs the corrected initial value compensation matrix $\alpha_1$ thereof to calculate an initial value compensation value in accordance with the above Expression (18).

In the same way as in the case of steps S7 and S8 in FIG. 11, in step S25 the initial value generating unit 151 supplies the initial value compensation value calculated by the processing in step S24 to the tracking servo control computing circuit 143, and in step S26 causes the tracking servo control computing circuit 143 to start the servo control. Upon completing the processing in step S26, the initial value generating unit 151 ends the initial value compensation value generating processing.

An initial value compensation value is obtained in such a way, whereby the initial value generating unit 151 can readily calculate an initial value compensation value to provide this to the control system, as compared to the case in FIG. 10. In other words, the initial value compensation value generating unit 224 can further readily perform the initial value compensation of the control system, as compared to the case of the initial value compensation value generating unit 124.

Note that the relative speed $e_v(0)$ may be calculated such as shown in the following Expression (19) by taking a difference between the current sample and the sample n samples ahead to reduce noise influence.

$$e_v(0) = \frac{s(0) - s(-n)}{nT} \quad (19)$$

At this time, tentatively, if Expression (15) might hold for the value n samples ahead as well, the initial value compensation value can be calculated in the same way as described above in accordance with Expression (17).

On the other hand, in a case where the relative position s(−n) is sufficiently greater than the relative position s(0), and Expression (15) does not hold, $K_v$ satisfying the following Expression (20) is selected.

$$\begin{aligned} e_v(0) &= \frac{s(0) - s(-n)}{nT} \\ &\approx K_v \frac{p(0) - p(-n)}{nT} \\ &= K_v p_v(0) \end{aligned} \quad (20)$$

The above Expression (12) can be represented such as shown in the following Expression (21) by applying this $K_v$ thereto.

$$\begin{aligned} \begin{pmatrix} x_L(0) \\ x_H(0) \end{pmatrix} &= \begin{pmatrix} k_{11} & k_{12} \\ k_{21} & k_{22} \end{pmatrix} \begin{pmatrix} e(0) \\ e_v(0) \end{pmatrix} \\ &= \begin{pmatrix} k_{11} & k_{12} \\ k_{21} & k_{22} \end{pmatrix} \begin{pmatrix} K_p p(0) \\ K_v p_v(0) \end{pmatrix} \end{aligned} \quad (21)$$

That is to say, the initial value generating unit 151 can calculate an initial value compensation value by employing this Expression (21).

Note that the configuration of the initial value compensation value generating unit in this case is basically the same as in the case of FIG. 10, and accordingly, the block diagram in FIG. 10 can be applied thereto. However, the relative speed generating unit 152 employs the value n samples ahead to generate relative speed in accordance with the above Expression (19). Also, the correction coefficient holding unit 153 also holds $K_v$ for speed as well as the $K_p$ as a correction coefficient. As shown in Expression (21), the initial value generating unit 151 corrects the push-pull signal p(0) and relative speed $p_v(0)$ by employing the correction coefficients $K_p$ and $K_v$ to calculate an initial value compensation value.

However, in FIG. 10, in the same way as in the case of the push-pull signal value p(−1) one sample ahead, at least the push-pull signal value p(−n) n samples ahead has to be held by either the tracking servo control computing circuit 143 or relative speed generating unit 152.

Also, the flow of the initial value compensation value generating processing in this case is basically the same as the flow described with reference to the flowchart in FIG. 11. However, in this case, in step S1 the push-pull signal value p(−n) n samples ahead is obtained instead of the push-pull signal value p(−1) one sample ahead. Also, in step S2 the relative speed $p_v(0)$ is calculated by employing the push-pull signal value p(−n) n samples ahead thereof. Further, in step S3 the correction coefficient $K_v$ for speed is also read out as well as the correction coefficient $K_p$, and in step S4 the relative speed $p_v(0)$ is corrected by employing the correction coefficient $K_v$ for speed thereof.

Thus, an initial value compensation value is calculated by employing the above Expression (21), whereby the initial value compensation value generating unit 124 can reduce influence due to the error, and obtain a sufficient advantage of initial value compensation at the control system, even in a case where the push-pull signal value p(−n) n samples ahead is relatively great, the error as to the original relative position s(n) is great, and a sufficient advantage is not obtained with the initial value compensation value calculated based on the above Expression (17).

Also, in the same way as in the case where the relative speed $p_v(0)$ is calculated by employing the push-pull signal value p(−1) one sample ahead, the initial value compensation matrix can also be corrected with the correction coefficient beforehand in this case. That is to say, in the same way as in the case of the above Expression (18), the above Expression (21) can be transformed such as shown in the following Expression (22).

$$\begin{pmatrix} x_L(0) \\ x_H(0) \end{pmatrix} = \begin{pmatrix} k_{11} & k_{12} \\ k_{21} & k_{22} \end{pmatrix} \begin{pmatrix} K_p p(0) \\ K_v p_v(0) \end{pmatrix} \quad (22)$$
$$= \begin{pmatrix} k_{11} \cdot K_p & k_{12} \cdot K_v \\ k_{21} \cdot K_p & k_{22} \cdot K_v \end{pmatrix} \begin{pmatrix} p(0) \\ p_v(0) \end{pmatrix}$$
$$= \alpha_2 \begin{pmatrix} p(0) \\ p_v(0) \end{pmatrix}$$

Like this Expression (22), an initial value compensation value can be readily calculated by employing the corrected initial value compensation matrix $\alpha_2$ which has been corrected with the correction coefficient.

Note that the configuration of the initial value compensation value generating unit in this case is also basically the same as in the case of FIG. 12, and accordingly, the block diagram in FIG. 12 can be applied thereto. However, the relative speed generating unit 152 employs the value n samples ahead to generate relative speed in accordance with the above Expression (19). Also, the corrected initial value compensation matrix holding unit 254 holds the corrected initial value compensation matrix $\alpha_2$ beforehand. As shown in Expression (22), the initial value generating unit 151 calculates an initial value compensation value from the push-pull signal p(0) and relative speed $p_v(0)$ by employing the corrected initial value compensation matrix $\alpha_2$.

However, in this case as well, at least the push-pull signal value p(−n) n samples ahead has to be held by either the tracking servo control computing circuit 143 or relative speed generating unit 152.

Also, the flow of the initial value compensation value generating processing in this case is basically the same as the flow described with reference to the flowchart in FIG. 13. However, in this case, in step S21 the push-pull signal value p(−n) n samples ahead is obtained instead of the push-pull signal value p(−1) one sample ahead. Also, in step S22 the relative speed $p_v(0)$ is calculated by employing the push-pull signal value p(−n) n samples ahead thereof. Further, in step S23 the corrected initial value compensation matrix $\alpha_2$ is read out, and in step S24 an initial value compensation value is calculated by employing the corrected initial value compensation matrix $\alpha_2$ thereof.

Thus, an initial value compensation value is calculated in accordance with the above Expression (22), whereby the initial value compensation value generating unit 224 can reduce influence due to the error, and obtain a sufficient advantage of initial value compensation at the control system, even in a case where the push-pull signal value p(−n) n samples ahead is relatively great, the error as to the original relative position s(n) is great, and a sufficient advantage is not obtained with the initial value compensation value calculated based on the above Expression (18). That is to say, the initial value compensation value generating unit 224 can further readily calculate an initial value compensation value as compared to the cased of calculating an initial value compensation value in accordance with Expression (21).

Description has been made so far regarding the case where the push-pull signal is employed as an error signal with the tracking servo control, but the present invention is not restricted to this, for example, may be applied to the focus servo control as well.

Figure 14:
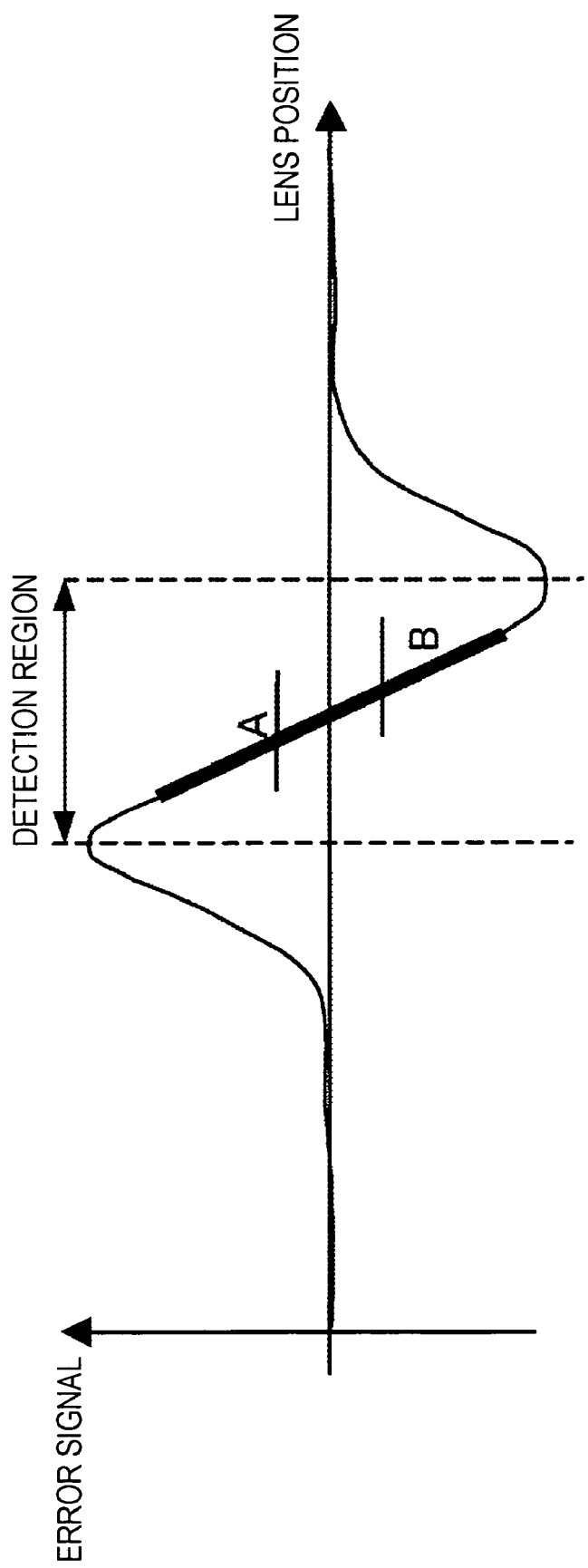
FIG. 14 is a diagram illustrating a relation between a lens position and an error signal with focus servo control.

FIG. 14 is a diagram illustrating the relation between a lens position and an error signal with the focus servo control. As shown in FIG. 14, in general, it has been understood that, with the focus servo control as well, an error signal exhibits the S'th order curve as to the lens position. That is to say, there is a possibility that an error signal is detected to be smaller than the original relative position in the same way as the case of the above-mentioned tracking servo control. Accordingly, the present invention may be applied to a case where the initial value compensation method is applied at the time of start of the operation of such a focus servo control system, in the same way as in the case of the above-mentioned tracking servo control.

Additionally, the present invention may be applied to other than the above-mentioned control system, as long as initial value compensation is performed as to a control system such that a signal indicating the state of an object of control causes an error as to the actual state at the time of start of control. That is to say, as long as the device includes such a control system, the present invention is not restricted to an optical disc recording/reproducing device, and may be applied to any kind of device.

Such a device may be, for example, an optical disc reproducing device which reads out data recorded in an optical disc to reproduce this, and does not perform writing of data to an optical disc, or an optical disc recording device which performs writing of data to an optical disc, and does not perform reading. Alternatively, such a device may be a device completely different from these, for example, such as a digital camera or the like.

It goes without saying that an object of control may be other than a recording/reproducing element. Also, an object of control may be provided separately, for example, with the example shown in FIG. 10, the control unit 122 and initial value compensation value generating unit 124 may be integrated to a single control device 125 which controls the recording/reproducing element 121 (electromagnetic actuator 123) which is an external object of control. Obviously, the electromagnetic actuator 123 may be included in the control device 125. Further, the initial value compensation value generating unit 124 may be a single device (initial value compensation value generating device) which provides an initial value compensation value to the external control unit 122.

The case in FIG. 12 is also the same, and the control unit 122 and initial value compensation value generating unit 224 may be the control device 225, or the initial value compensation value generating unit 224 may be a single device (initial value compensation value generating device).

The above-mentioned series of processing can be executed not only by hardware but also by software. In this case, for example, the above-mentioned series of processing may be configured as a personal computer such as shown in FIG. 15.

In FIG. 15, a CPU (Central Processing Unit) 301 of a personal computer 300 executes various types of processing in accordance with a program stored in ROM 302, or a program loaded into RAM 303 from a storage unit 313. Data or the like used by the CPU 301 to execute various types of processing is also stored in the RAM 303 as appropriate. The CPU 301, ROM 302, and RAM 303 are mutually connected through a bus 304. An input/output interface 310 is also connected to the bus 304.

The input/output interface 310 is connected with an input unit 311 made up of a keyboard, mouse, and so forth, an output unit 312 made up of a display configured of CRT (Cathode Ray Tube), LCD (Liquid Crystal Display), or the like, speaker, and so forth, a storage unit 313 configured of a hard disk or the like, and a communication unit 314 configured of a modem or the like. The communication unit 314 performs communication processing through a network including the Internet.

The input/output interface 310 is also connected with a drive 315 as appropriate, on which a removable medium 321 such as a magnetic disk, optical disc, magneto-optical disk, semiconductor, or the like is mounted as appropriate, and a computer program read out therefrom is installed into the storage unit 313 as appropriate.

In a case where the above-mentioned series of processing is executed by software, a program making up the software thereof is installed from a network or recording medium.

The recording medium is not restricted to being configured of, separately from the device main unit such as shown in FIG. 15, the removable medium 321 made up of a magnetic disk (including a flexible disk), optical disc (including CD-ROM (Compact Disc-Read Only Memory), DVD (Digital Versatile Disc)), magneto-optical disk (including MD (Mini Disc)), semiconductor memory, or the like wherein a program to be distributed to a user is recorded, but also may be the ROM 302, a hard disk included in the storage unit 313, or the like, wherein a program to be distributed to a user in a state built into a device main unit beforehand has been recorded.

Note that, with the present Specification, steps describing a program to be recorded in a recording medium include not only processing performed in time series along a described order but also processing executed in parallel or individually even though not necessarily performed in time series. Also, with the present Specification, the term "system" represents the entirety of equipment configured of multiple devices.

Note that the configuration described above as a single device may be configured as multiple devices. Conversely, the configuration described above as multiple devices may be configured as a single device collectively. Also, a configuration other than the above configuration may be added to the configuration of each device. Further, if the configuration and operation as the entire system are substantially the same, a part of the configuration of a certain device may be included in another device. That is to say, embodiments of the present invention are not restricted to the above-mentioned embodiment, and various changes can be made without departing from the essence and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
correction coefficient holding means configured to hold a correction coefficient Kp which is a ratio between the position of an object of control at a start time of control operation, and a detection signal indicating the control result of said object of control, with a control system for controlling the operation of said object of control so as to direct the angle or position thereof toward a target value;
initial value compensation matrix holding means configured to hold an initial value compensation matrix for performing compensation of the initial value of a control computing unit for computing control output for controlling said object of control from said detection signal based on the position and speed of said object of control;
initial value generating means configured to correct the position and speed of said object of control at a start time of control operation with said correction coefficient, and employ the position and speed of said object of control after correction, and said initial value compensation matrix to generate an initial value compensation value for compensating the initial value of said control computing unit; and,
wherein the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

2. The information processing device according to claim 1, further comprising:
speed generating means configured to generate from the position of said object of control at a start time of control operation the speed of said object of control at said start time of control operation;
wherein said initial value generating means employ said speed generated by said speed generating means to generate said initial value compensation value.

3. The information processing device according to claim 2, wherein said speed generating means generate said speed based on the position of said object of control at a start time of control operation, and the position of said object of control one sample ahead from said start time of control operation.

4. The information processing device according to claim 2, wherein said speed generating means generate said speed based on the position of said object of control at a start time of control operation, and the position of said object of control a plurality of samples ahead from said start time of control operation.

5. The information processing device according to claim 4, wherein said correction coefficient holding means hold a correction coefficient for position for correcting the position of said object of control, and a correction coefficient for speed for correcting the speed of said object of control.

6. An information processing method comprising the steps of:
holding a correction coefficient Kp which is a ratio between the position of an object of control at a start time of control operation, and a detection signal indicating the control result of said object of control, with a control system for controlling the operation of said object of control so as to direct the angle or position thereof toward a target value;
holding an initial value compensation matrix for performing compensation of the initial value of a control computing unit for computing control output for controlling said object of control from said detection signal based on the position and speed of said object of control; and correcting the position and speed of said object of control at a start time of control operation with said correction coefficient, and employing the position and speed of said object of control after correction, and said initial value compensation matrix to generate an initial value compensation value for compensating the initial value of said control computing unit; and, wherein, the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

7. A non-transitory computer readable medium comprising a program, the program, when executed by a computer, causing the computer to function as:

correction coefficient holding means configured to hold a correction coefficient Kp which is a ratio between the position of an object of control at a start time of control operation, and a detection signal indicating the control result of said object of control, with a control system for controlling the operation of said object of control so as to direct the angle or position thereof toward a target value;

initial value compensation matrix holding means configured to hold an initial value compensation matrix for performing compensation of the initial value of a control computing unit for computing control output for controlling said object of control from said detection signal based on the position and speed of said object of control;

initial value generating means configured to correct the position and speed of said object of control at a start time of control operation with said correction coefficient, and employ the position and speed of said object of control after correction, and said initial value compensation matrix to generate an initial value compensation value for compensating the initial value of said control computing unit; and, wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

8. A recording/reproducing device, comprising:

a recording/reproducing element configured to perform writing or reading of data as to a disc-shaped recording medium;

driving means configured to drive said recording/reproducing element in the horizontal direction or vertical direction as to a recording face of said disc-shaped recording medium;

error signal detecting means configured to detect an error signal which is proportional to the difference between a position to be recorded/reproduced by said recording/reproducing element and the actual position;

control computing means configured to employ a control parameter to perform control calculation as to the detection signal detected by said error signal detecting means, and calculate control output for reducing the absolute value of said error signal; and initial value compensation value generating means configured to generate an initial value compensation value for compensating the initial value of said control computing means at a start time of control operation with a servo control system including said driving means, said error signal detecting means, and said control computing means;

wherein said initial value compensation value generating means include correction coefficient holding means configured to hold a correction coefficient Kp which is a ratio between the position of said recording/reproducing element at a start time of control operation, and said error signal, initial value compensation matrix holding means configured to hold an initial value compensation matrix for performing compensation of the initial value of said control computing means based on the position and speed of said recording/reproducing element at a start time of control operation, and initial value generating means configured to correct the position and speed of said object of control at a start time of control operation with said correction coefficient, employ the position and speed of said object of control after correction, and said initial value compensation matrix to generate said initial value compensation value; and, wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

9. An information processing device comprising:

corrected initial value compensation matrix holding means configured to hold a correction coefficient Kp which is a ratio between the position of an object of control at a start time of control operation, and a detection signal indicating the control result of said object of control, and a corrected initial value compensation matrix which is a multiplication result of an initial value compensation matrix for performing compensation of the initial value of a control computing unit for computing control output for controlling said object of control from said detection signal based on the position and speed of said object of control at a start time of control operation, with a control system for controlling the operation of said object of control so as to direct the angle or position thereof toward a target value; and initial value generating means configured to employ the position and speed of said object of control at a start time of control operation, and said corrected initial value compensation matrix to generate an initial value compensation value for compensating the initial value of said control computing unit; and, wherein the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

10. The information processing device according to claim 9, further comprising:
- speed generating means configured to generate from the position of said object of control at a start time of control operation the speed of said object of control at said start time of control operation;
- wherein said initial value generating means employ said speed generated by said speed generating means to generate said initial value compensation value.

11. The information processing device according to claim 10, wherein said speed generating means generate said speed based on the position of said object of control at a start time of control operation, and the position of said object of control one sample ahead from said start time of control operation.

12. The information processing device according to claim 10, wherein said speed generating means generate said speed based on the position of said object of control at a start time of control operation, and the position of said object of control a plurality of samples ahead from said start time of control operation.

13. The information processing device according to claim 12, wherein said corrected initial value compensation matrix holding means hold a multiplication result obtained by multiplying said initial value compensation matrix by correction coefficient for position for correcting the position of said object of control, and a correction coefficient for speed for correcting the speed of said object of control, as said corrected initial value compensation matrix.

14. An information processing method comprising the steps of:
- holding a correction coefficient Kp which is a ratio between the position of an object of control at a start time of control operation, and a detection signal indicating the control result of said object of control, and a corrected initial value compensation matrix which is a multiplication result of an initial value compensation matrix for performing compensation of the initial value of a control computing unit for computing control output for controlling said object of control from said detection signal based on the position and speed of said object of control at a start time of control operation, with a control system for controlling the operation of said object of control so as to direct the angle or position thereof toward a target value; and
- employing the position and speed of said object of control at a start time of control operation, and said corrected initial value compensation matrix to generate an initial value compensation value for compensating the initial value of said control computing unit; and,
- wherein the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

15. A non-transitory computer-readable medium comprising a program, the program, when executed by a computer, causing the computer to function as:
- corrected initial value compensation matrix holding means configured to hold a correction coefficient Kp which is a ratio between the position of an object of control at a start time of control operation, and a detection signal indicating the control result of said object of control, and a corrected initial value compensation matrix which is a multiplication result of an initial value compensation matrix for performing compensation of the initial value of a control computing unit for computing control output for controlling said object of control from said detection signal based on the position and speed of said object of control at a start time of control operation, with a control system for controlling the operation of said object of control so as to direct the angle or position thereof toward a target value; and
- initial value generating means configured to employ the position and speed of said object of control at a start time of control operation, and said corrected initial value compensation matrix to generate an initial value compensation value for compensating the initial value of said control computing unit; and,
- wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

16. A recording/reproducing device comprising:
- a recording/reproducing element configured to perform writing or reading of data as to a disc-shaped recording medium;
- driving means configured to drive said recording/reproducing element in the horizontal direction or vertical direction as to a recording face of said disc-shaped recording medium;
- error signal detecting means configured to detect an error signal which is proportional to the difference between a position to be recorded/reproduced by said recording/reproducing element and the actual position;
- control computing means configured to employ a control parameter to perform control calculation as to the detection signal detected by said error signal detecting means, and calculate control output for reducing the absolute value of said error signal; and
- initial value compensation value generating means configured to generate an initial value compensation value for compensating the initial value of said control computing means at a start time of control operation with a servo control system including said driving means, said error signal detecting means, and said control computing means;
- wherein said initial value compensation value generating means include
- corrected initial value compensation matrix holding means configured to hold a correction coefficient Kp which is a ratio between the position of said recording/reproducing element at a start time of control operation, and said error signal, and a corrected initial value compensation matrix which is a multiplication result of an initial value compensation matrix for performing compensation of the initial value of said control computing means based on the position and speed of said recording/reproducing element at a start time of control operation, and
- initial value generating means configured to employ the position and speed of said object of control at a start time of control operation, and said corrected initial value compensation matrix to generate said initial value compensation value; and, wherein the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

17. An information processing device comprising:
a correction coefficient holding unit configured to hold a correction coefficient Kp which is a ratio between the position of an object of control at a start time of control operation, and a detection signal indicating the control result of said object of control, with a control system for controlling the operation of said object of control so as to direct the angle or position thereof toward a target value;
an initial value compensation matrix holding unit configured to hold an initial value compensation matrix for performing compensation of the initial value of a control computing unit for computing control output for controlling said object of control from said detection signal based on the position and speed of said object of control; and
an initial value generating unit configured to correct the position and speed of said object of control at a start time of control operation with said correction coefficient, and employ the position and speed of said object of control after correction, and said initial value compensation matrix to generate an initial value compensation value for compensating the initial value of said control computing unit; and,
wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

18. A non-transitory computer readable medium including a program, the program, when executed by a computer, causes the computer to function as:
a correction coefficient holding unit configured to hold a correction coefficient Kp which is a ratio between the position of an object of control at a start time of control operation, and a detection signal indicating the control result of said object of control, with a control system for controlling the operation of said object of control so as to direct the angle or position thereof toward a target value;
an initial value compensation matrix holding unit configured to hold an initial value compensation matrix for performing compensation of the initial value of a control computing unit for computing control output for controlling said object of control from said detection signal based on the position and speed of said object of control; and
an initial value generating unit configured to correct the position and speed of said object of control at a start time of control operation with said correction coefficient, and employ the position and speed of said object of control after correction, and said initial value compensation matrix to generate an initial value compensation value for compensating the initial value of said control computing unit; and, wherein the correction coefficient Kp is determined using a formula $$K_p = \frac{p_{max} \times \sin^{-1}\left(\frac{p_s}{p_{max}}\right)}{p_s};$$

wherein Ps denotes a start position signal and Pmax denotes a maximum position signal.

19. A recording/reproducing device comprising:
a recording/reproducing element configured to perform writing or reading of data as to a disc-shaped recording medium;
a driving unit configured to drive said recording/reproducing element in the horizontal direction or vertical direction as to a recording face of said disc-shaped recording medium;
an error signal detecting unit configured to detect an error signal which is proportional to the difference between a position to be recorded/reproduced by said recording/reproducing element and the actual position;
a control computing unit configured to employ a control parameter to perform control calculation as to the detection signal detected by said error signal detecting unit, and calculate control output for reducing the absolute value of said error signal; and
an initial value compensation value generating unit configured to generate an initial value compensation value for compensating the initial value of said control computing unit at a start time of control operation with a servo control system including said driving unit, said error signal detecting unit, and said control computing unit;
wherein said initial value compensation value generating unit include
a correction coefficient holding unit configured to hold a correction coefficient Kp which is a ratio between the position of said recording/reproducing element at a start time of control operation, and said error signal,
an initial value compensation matrix holding unit configured to hold an initial value compensation matrix for performing compensation of the initial value of said control computing unit based on the position and speed of said recording/reproducing element at a start time of control operation, and
an initial value generating unit configured to correct the position and speed of said object of control at a start time of control operation with said correction coefficient, and employ the position and speed of said object of control after correction, and said initial value compensation matrix to generate said initial value compensation value; and,
wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

20. An information processing device comprising:
a corrected initial value compensation matrix holding unit configured to hold a correction coefficient Kp which is a ratio between the position of an object of control at a start time of control operation, and a detection signal indicating the control result of said object of control, and a corrected initial value compensation matrix which is a multiplication result of an initial value compensation matrix for performing compensation of the initial value of a control computing unit for computing control output for controlling said object of control from said detection signal based on the position and speed of said object of control at a start time of control operation, with a control system for controlling the operation of said object of control so as to direct the angle or position thereof toward a target value; and
an initial value generating unit configured to employ the position and speed of said object of control at a start time of control operation, and said corrected initial value compensation matrix to generate an initial value compensation value for compensating the initial value of said control computing unit; and,
wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

21. A non-transitory computer readable medium comprising a program, the program, when executed by a computer, causes the computer to function as:
a corrected initial value compensation matrix holding unit configured to hold a correction coefficient Kp which is a ratio between the position of an object of control at a start time of control operation, and a detection signal indicating the control result of said object of control, and a corrected initial value compensation matrix which is a multiplication result of an initial value compensation matrix for performing compensation of the initial value of a control computing unit for computing control output for controlling said object of control from said detection signal based on the position and speed of said object of control at a start time of control operation, with a control system for controlling the operation of said object of control so as to direct the angle or position thereof toward a target value; and
an initial value generating unit configured to employ the position and speed of said object of control at a start time of control operation, and said corrected initial value compensation matrix to generate an initial value compensation value for compensating the initial value of said control computing unit; and,
wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

22. A recording/reproducing device comprising:
a recording/reproducing element configured to perform writing or reading of data as to a disc-shaped recording medium;
a driving unit configured to drive said recording/reproducing element in the horizontal direction or vertical direction as to a recording face of said disc-shaped recording medium;
an error signal detecting unit configured to detect an error signal which is proportional to the difference between a position to be recorded/reproduced by said recording/reproducing element and the actual position;
a control computing unit configured to employ a control parameter to perform control calculation as to the detection signal detected by said error signal detecting unit, and calculate control output for reducing the absolute value of said error signal; and
an initial value compensation value generating unit configured to generate an initial value compensation value for compensating the initial value of said control computing unit at a start time of control operation with a servo control system including said driving unit, said error signal detecting unit, and said control computing unit;
wherein said initial value compensation value generating unit include
a corrected initial value compensation matrix holding unit configured to hold a correction coefficient Kp which is a ratio between the position of said recording/reproducing element at a start time of control operation, and said error signal, and a corrected initial value compensation matrix which is a multiplication result of an initial value compensation matrix for performing compensation of the initial value of said control computing unit based on the position and speed of said recording/reproducing element at a start time of control operation, and
an initial value generating unit configured to employ the position and speed of said object of control at a start time of control operation, and said corrected initial value compensation matrix to generate said initial value compensation value; and,
wherein the correction coefficient Kp is determined from a formula $$K_p = \frac{p_{max} \times \sin^{-1}\left(\frac{p_s}{p_{max}}\right)}{p_s};$$

wherein Ps denotes a start position signal and Pmax denotes a maximum position signal.

* * * * *